(12) United States Patent
Jain et al.

(10) Patent No.: US 9,076,119 B2
(45) Date of Patent: Jul. 7, 2015

(54) RFID-BASED INVENTORY MONITORING SYSTEMS AND METHODS WITH SELF-ADJUSTING OPERATIONAL PARAMETERS

(71) Applicant: SYMBOL TECHNOLOGIES, INC., Lincolnshire, IL (US)

(72) Inventors: Binit Jain, Schaumburg, IL (US); Randy L. Ekl, Lake Zurich, IL (US); Daniel S. Griesmann, Villa Park, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 164 days.

(21) Appl. No.: 13/627,542

(22) Filed: Sep. 26, 2012

(65) Prior Publication Data
US 2014/0084060 A1    Mar. 27, 2014

(51) Int. Cl.
*G06F 19/00* (2011.01)
*G06Q 10/08* (2012.01)

(52) U.S. Cl.
CPC ................................ *G06Q 10/087* (2013.01)

(58) Field of Classification Search
USPC ....................................................... 235/385
See application file for complete search history.

(56) References Cited

U.S. PATENT DOCUMENTS

| | | | |
|---|---|---|---|
| 6,914,415 B2 | 7/2005 | Bohne et al. | |
| 7,640,194 B2 | 12/2009 | Bodin et al. | |
| 7,667,602 B2 | 2/2010 | Ulrich | |
| 7,672,872 B2 | 3/2010 | Shanton | |
| 7,843,343 B2 | 11/2010 | Thorn | |
| 8,044,814 B2 | 10/2011 | Bruce et al. | |
| 8,175,925 B1 | 5/2012 | Rouaix | |
| 2003/0216969 A1 | 11/2003 | Bauer et al. | |
| 2005/0083181 A1 | 4/2005 | Jalkanen et al. | |
| 2006/0267733 A1 | 11/2006 | Steinke et al. | |
| 2007/0126555 A1 | 6/2007 | Bandy | |
| 2007/0126635 A1 | 6/2007 | Houri | |
| 2009/0079571 A1 | 3/2009 | Calvarese | |
| 2009/0222129 A1* | 9/2009 | Waddington et al. | 700/216 |
| 2010/0019905 A1* | 1/2010 | Boddie et al. | 340/572.1 |
| 2010/0097597 A1 | 4/2010 | Andres et al. | |
| 2010/0156597 A1 | 6/2010 | Stern | |

(Continued)

OTHER PUBLICATIONS

International Preliminary Report on Patentability and Written Opinion for related International Application No. PCT/US2011/066435 mailed on Jul. 4, 2013.

(Continued)

*Primary Examiner* — Michael G Lee
*Assistant Examiner* — David Tardif

(57) ABSTRACT

An inventory monitoring controller maintains information reflecting a current inventory of articles based on radio frequency identification (RFID) tag identifying information received from one or more RFID tag readers in the context of inventory polling operations. In an embodiment, the controller also adjusts an operational parameter (e.g., a missing article detection threshold or a variable polling parameter) based on an analysis of the RFID tag identifying information. For example, a variable polling parameter may be adjusted in response to an occurrence of a triggering event (e.g., an inventory change indicated by the RFID tag identifying information or an occurrence of a temporal event), and a missing article detection threshold may be adjusted based on historical information relating to the detection of (or failure to detect) a particular RFID tag.

13 Claims, 13 Drawing Sheets

(56) References Cited

U.S. PATENT DOCUMENTS

| | | |
|---|---|---|
| 2010/0156650 A1 | 6/2010 | Stern |
| 2010/0201488 A1 | 8/2010 | Stern et al. |
| 2010/0201520 A1 | 8/2010 | Stern et al. |
| 2010/0214076 A1 | 8/2010 | Yamamoto |
| 2011/0029397 A1 | 2/2011 | Junger |
| 2011/0199211 A1 | 8/2011 | Campero |
| 2012/0052337 A1 | 3/2012 | Krishnamurthi et al. |
| 2012/0161967 A1* | 6/2012 | Stern .......................... 340/572.1 |

OTHER PUBLICATIONS

Non Final Office Action mailed on Mar. 29, 2012 in related U.S. Appl. No. 12/975,971, Miklos Stern, filed Dec. 22, 2010.

Notice of Allowance mailed on May 22, 2013 in related U.S. Appl. No. 12/975,971, Miklos Stern, filed Dec. 22, 2010.

International Search Report and Written Opinion for International Application No. PCT/US2011/066435 mailed on Apr. 5, 2012 for related application.

\* cited by examiner

*400*

| 402 | TRIGGERING TEMPORAL EVENTS TABLE | 404 |
|---|---|---|
| | EVENT TIME/DATE | POLLING PARAMETER ADJUSTMENT |
| 410 | 08:00 AM M, T, W, TH, F, SA | SET PF TO ONCE/HOUR |
| 411 | 11:00 AM M, T, W, TH, F, SA | SET PF TO ONCE PER 30 MIN |
| 412 | 07:00 PM M, T, W, TH, F, SA | SET PF TO ONCE PER HOUR |
| 413 | 09:00 PM M, T, W, TH, F, SA, SU | SET PF TO ZERO |
| 414 | DECEMBER 1 - JANUARY 1 | INCREASE NOMINAL PF BY 50% |
| 415 | DECEMBER 1 | INCREASE NOMINAL PF BY 50% |
| 416 | JANUARY 1 | DECREASE PF TO NOMINAL |

*FIG. 4*

SHADOW INVENTORY TABLE 600

| ARTICLE 602 | POTENTIALLY MISSING? 603 | MISSING ARTICLE DETECTION THRESHOLD 604 | CONSECUTIVE MISSED POLLS 606 | DECLARED MISSING? 608 | ERROR VARIABLE 610 | POLLS SINCE LAST MISS 612 |
|---|---|---|---|---|---|---|
| A00067 | YES | 5 | 1 | NO | 10 | 0 |
| D21708 | NO | 10 | 0 | NO | 20 | 1 |
| B07412 | NO | 4 | 0 | NO | 4 | 60 |
| B55437 | YES | 5 | 15 | YES | 10 | 0 |
| Z77662 | NO | 1 | 0 | NO | 1 | 1207 |
| C44140 | NO | 1 | 0 | NO | 1 | 1189 |

| TAG ID | READER ID | SKU ATTRIBUTE 1 | SKU ATTRIBUTE 1 | ... | SKU ATTRIBUTE X | LOCATION |
|---|---|---|---|---|---|---|
| 1 | 1 | BRAND A | RED | | MEN'S | NEAR EXIT |
| 2 | 1 | BRAND A | BLUE | | MEN'S | NEAR EXIT |
| 3 | 2 | BRAND B | RED | | WOMAN'S | BY POLE 43 |
| ... | | | | ... | | ... |
| N | M | BRAND X | | | | |

FIG. 12

RFID-BASED INVENTORY MONITORING SYSTEMS AND METHODS WITH SELF-ADJUSTING OPERATIONAL PARAMETERS

TECHNICAL FIELD

Embodiments of the present invention generally relate to Radio Frequency Identification (RFID) based inventory systems and methods of their operation.

BACKGROUND

Historically, taking inventory of saleable articles in a retail store has been a labor intensive process, which typically involves store personnel making rounds through the store and manually counting and logging quantities of each type of article. More recently, barcode scanning systems have been employed to increase the efficiency and accuracy of taking inventory. Using a barcode scanning system, articles within a store are tagged with barcodes, which are optically readable by handheld barcode scanners. In order to take inventory using such a system, store personnel still are required to make rounds through the store and scan each barcode with a barcode scanner. However, the barcode scanner is configured to log the barcode information electronically, thus reducing the time to log each article, and accordingly, reducing the overall time to take inventory. In addition, the barcode scanner reads and logs the barcode information more accurately than human personnel, which provides the benefit of increased accuracy of the inventory-taking process. However, due to the labor intensive nature of the inventory taking process with barcode scanners, a typical retail store may take a full inventory only once a year or so.

More recently, radio frequency identification (RFID) technologies have been exploited to increase the efficiency and potentially the accuracy of inventory-taking processes. Using this technology, an RFID tag is applied to each article for which inventory tracking is desired. The RFID tags are capable of transmitting an information-bearing, radio frequency signal (e.g., a signal that includes an identification number) in response to a tag interrogation signal from an RFID tag reader. In order to take inventory, store personnel with handheld RFID tag readers make rounds through the store and, at various locations, cause the RFID tag reader to interrogate any RFID tags that may be within range of the RFID tag reader. The information collected by the RFID tag reader may then be analyzed to generate an estimate of the current inventory. As with the barcode scanning system, an RFID system has the benefit of increased accuracy over manual inventory-taking processes. In addition, an inventory-taking process may be more efficiently performed using an RFID system, when compared with a barcode scanning system, since the individual who is taking inventory is not required physically to handle each tag in order to receive its identification information, and the RFID tag reader is able to receive responses from multiple RFID tags for each RFID tag interrogation signal that it transmits.

Although the use of barcode scanning systems and RFID systems have increased the efficiency and accuracy associated with taking inventory, the process still takes dedicated human resources and a significant amount of time to complete. Accordingly, even with RFID systems, a retail store may take inventory relatively infrequently (e.g., perhaps once a month, once a week, or less often). This lack of timely knowledge of the current inventory at a retail store may result in lost sales. In addition, neither system enables store personnel readily to determine the locations of particular articles within the store. Inaccurate knowledge of current inventory may, in some circumstances, lead to less-than-optimal customer satisfaction due to unavailability of desired articles or sizes and/or the inability to locate desired articles, for example. Accordingly, what are needed are inventory monitoring systems that enable inventory to be taken accurately and more often than is practicable with conventional, barcode scanner-based inventory systems. Further needed are inventory monitoring systems that enable specific articles readily to be located within a store or other controlled area. It would be beneficial if the inventory monitoring system would be capable of sensing misplaced items and notifying a user of the misplaced item. It would also be beneficial if the inventory monitoring system could suggest locations for new and misplaced items.

BRIEF DESCRIPTION OF THE DRAWINGS

Embodiments of the present invention will hereinafter be described in conjunction with the following drawing figures, wherein like numerals denote like elements.

FIG. 4 is an example of a triggering temporal events table, in accordance with an embodiment;

FIG. 6 is an example of a shadow inventory table, in accordance with an example embodiment;

FIG. 12 is a table illustrating operation.

DETAILED DESCRIPTION

Embodiments include methods and apparatus for performing inventory monitoring within a controlled area (e.g., a retail store, a warehouse, or another controlled or confined area). Generally, the embodiments include an inventory monitoring controller, which maintains information reflecting a current and historical inventory of articles within the controlled area. The inventory monitoring controller receives information from one or more Radio Frequency Identification (RFID) tag readers distributed throughout the controlled area regarding the presence of RFID tags attached to the articles. Essentially, each RFID tag reader is configured to perform polling operations that detect the presence of RFID tags within range of the RFID tag reader, and to transmit RFID tag identifying information that identifies the detected RFID tags to the inventory monitoring controller. When the RFID tag for an article that is included in the current inventory fails to be detected a threshold number of times (e.g., a "missing article detection threshold"), the inventory monitoring controller may remove the article from the current inventory, in an embodiment. The RFID tag readers perform the polling operations at various times that are defined by "polling parameters" (e.g., specified polling times, frequencies, time durations between polling operations, polling antenna selections, and/or polling antenna activation durations). According to various embodiments, the inventory monitoring controller may adjust one or more of the polling parameters and/or missing article detection thresholds (referred to generally as "operational parameters") based on the RFID tag identifying information received from the RFID tag readers in conjunction with historical inventory data maintained in the system database.

Figure 1:
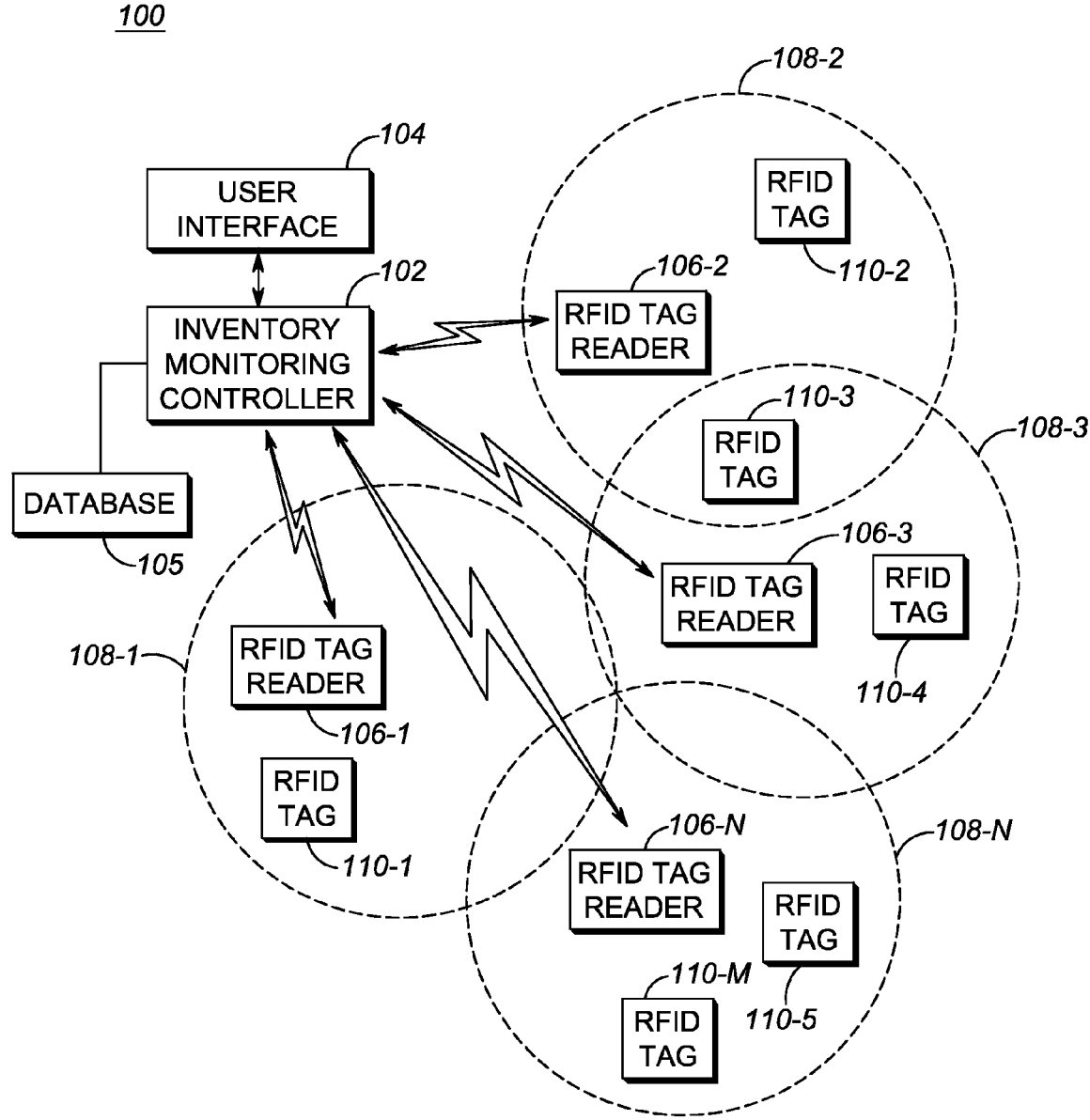
FIG. 1 is a simplified depiction of a Radio Frequency Identification (RFID) based inventory monitoring system, in accordance with an example embodiment.

FIG. 1 is a simplified depiction of an RFID-based inventory monitoring system 100, in accordance with an example embodiment. System 100 includes an inventory monitoring controller 102, a user interface 104, one or more RFID tag readers 106-1, 106-2, 106-3, 106-N (referred to collectively herein as RFID tag readers 106), and one or more RFID tags 110-1, 110-2, 110-3, 110-4, 110-5, 110-M (referred to collectively herein as RFID tags 110). Although only four RFID tag readers 106 are illustrated in FIG. 1, the number of RFID tag readers 106 may be any integer number, N, where N may be from 1 to potentially hundreds of RFID tag readers 106. In addition, although only five RFID tags 110 are illustrated in FIG. 1, the number of RFID tags 110 may be any integer number, M, where M may be from 1 to potentially thousands of RFID tags 110. Although the same reference number, 106, has been used to designate each RFID tag reader, it is to be understood that the RFID tag readers 106 need not be identical to each other, and may have different architectures and methods of operation, as long as those architectures and methods of operation are consistent with the various embodiments, described herein. Similarly, although the same reference number, 110, has been used to designate each RFID tag, it is to be understood that various different types of RFID tags may be employed in the system (e.g., active RFID tags, passive RFID tags, and/or battery-assisted passive RFID tags).

User interface 104, which is communicatively coupled with the inventory monitoring controller 102, is configured to provide inventory-related information (e.g., representations of inventory) to a human user, and to initiate and/or alter the execution of various processes that may be performed by system 100. For example, user interface 104 may be configured to provide a graphical user interface (GUI), which enables a user to view representations of inventory (e.g., quantities of articles in inventory, locations or articles in inventory, and so on) in pictorial and/or textual forms, to initiate an inventory taking process, to cause the system 100 to determine the location of an RFID tag 110 associated with a particular article, to determine the location of a particular RFID tag reader 106, to alter various operational parameters of the system 100, to request inventory-related reports, and to perform other actions such as sensing misplaced items, notifying a user of the misplaced item, and suggesting locations for new and misplaced items. In addition, in an embodiment, user interface 104 provides a way of conveying (e.g., displaying) inventory information to the user. In particular, in an embodiment, inventory information may be displayed to the user as a planogram, which provides information about the location of various RFID tags 110 within the controlled area, including the locations of desired or misplaced items. For items that are misplaced, the user interface 104 additionally may display the correct locations for those items, which enables store personnel to efficiently organize inventory in a desired way. According to an embodiment, the user interface 104 also may display the nature (e.g., type, description, SKU, etc.) and desired location of articles in need of replenishment (e.g., articles for which the inventory has been depleted entirely or to a relatively low level).

In order to provide the above features (and additional features), user interface 104 may include a computer, a monitor, a keyboard, a mouse, a printer, and various other hardware components to provide a man/machine interface. In an embodiment, user interface 104 and inventory monitoring controller 102 may include distinct hardware components. In such an embodiment, user interface 104 may be co-located or remotely-located from inventory monitoring controller 102, and accordingly user interface 104 may be operably connected with inventory monitoring controller 102 via wired, wireless, direct, or networked connections. In an alternate embodiment, user interface 104 and inventory monitoring controller 102 may utilize some shared hardware components (e.g., processors, memory, and so on).

Inventory monitoring controller 102 is configured to maintain inventory information regarding quantities of a plurality of articles that are present within a "controlled area" at which the system 100 is installed (e.g., a retail store, a warehouse, and so on). Inventory monitoring controller 102 may be located within wireless communication range of RFID tag readers 106 and/or user interface 104, or may be remotely located, and configured to communicate with RFID tag readers 106 and/or user interface 104 via wired and/or wireless network connections. According to an embodiment, inventory monitoring controller 102 maintains a "current inventory" reflecting the best estimate of the actual inventory in the controlled area. For example, the current inventory may be stored and maintained in an inventory database, which is stored locally with the inventory monitoring controller 102 or which is stored in a separate database server.

Inventory monitor controller 102 also maintains historical inventory information regarding quantities of a plurality of articles that are present within a "controlled area" at which the system 100 is installed (e.g., a retail store, a warehouse, and so on). Inventory monitor controller 102 will "learn" associations between items and keep a database about the intended location of an item based on the associations. More particularly, controller 102 makes use of the Stock-Keeping Unit (SKU) information along with the RF read data to determine historical association information of items and their SKUs. Such associations comprise, but are not limited to:

Association of an item with another item: An item may be associated with another item, for example items having a certain SKU/product attribute (also referred to as a product attribute) may always be located together;

Association of an item with an area: An item may be associated with a particular area. For example, items having a certain SKU/product attribute may be predominantly located in a particular area of a store, factory, a library, an office building, and so on (area may be determined by which reader read a particular tag);

Association of an item with a landmark: An item may be associated with a particular landmark. For example items having a certain SKU/product attribute may always be located near, for example, an entrance or some fixed landmarks in the store;

Associations may be strong or weak depending upon how long groups of items have had the particular association (i.e. more recently and for a longer period of time are better indicators of intended location). Associations can also be based on number of articles in a group (larger groups of related items are more likely to indicate an intended association rather than a random event).

Based on past associations between items, controller 102 can suggest locations of items. For example, if controller 102 was queried on a possible location for a red polo shirt manufactured by XYZ Corporation, a past association may be utilized to determine that red polo shirts are always located together. Alternatively, it may be determined that products from XYZ corporation are always located together. These determined associations may be output to the user along with an indication of the strength of the association.

When new articles are added to the controlled area (e.g., a new shipment of goods is received and placed on the retail floor for sale), the new articles are added to the current inventory. Conversely, when articles are transacted (e.g., sold or intentionally removed from the controlled area) or declared missing (e.g., lost or stolen), the inventory monitoring system 102 removes the articles from the current inventory. As will be described in more detail below, the inventory monitoring controller 102 may declare an item to be missing in response to an analysis of RFID tag identifying information received from the RFID tag readers 106. For example, when received RFID tag identifying information indicates that an RFID tag associated with an article in the current inventory has not been detected a threshold number of times (referred to herein as the "missing article detection threshold"), the inventory monitoring controller 102 may declare the article to be missing, and may remove the article from the current inventory. As will be described in more detail below, the inventory monitoring controller 102 may maintain and alter a missing article detection threshold on an overall system basis, on an RFID tag reader 106 basis, or on an RFID tag 110 or article basis, according to various embodiments. In addition, inventory monitoring controller 102 may add an article to the current inventory when an RFID tag reader 106 has detected and reported to the inventory monitoring controller 102 an RFID tag 110 associated with a new article that is within range of the RFID tag reader 106 (e.g., within the "field of view" of the RFID tag reader 106).

In addition to maintaining a current inventory, the inventory monitoring controller 102 also may control "variable polling parameters," which include the timing, frequency, and/or duration of polling operations performed by the RFID tag readers 106, according to various embodiments. In addition, in an embodiment in which the RFID tag readers 106 include multiple polling antennas, the "variable polling parameters" may include polling antenna selections within an RFID tag reader 106 and/or polling antenna activation durations for such antennas. A "polling operation" is an operation conducted by an RFID tag reader 106, which includes the RFID tag reader 106 transmitting RFID tag interrogation signals and receiving RFID tag response signals from RFID tags 110 within range of the RFID tag reader 106. As will be described in more detail below, for each polling operation (or less frequently), an RFID tag reader 106 may transmit RFID tag identifying information to the inventory monitoring controller 102, which indicates the identities of each RFID tag 110 for which the RFID tag reader 106 has received an RFID tag response signal and SKU/product information for the tag, It should be noted that SKU/product information may not be received directly from the RFID tag. The server may alternatively maintain a database of tag ID to SKU mappings. In many cases obtaining SKU from the server database is preferable to poling the tag.

The inventory monitoring controller 102 may analyze the RFID tag identifying information and SKU/product attribute, and modify the current inventory accordingly. In an embodiment, the inventory monitoring controller 102 may then alter the variable polling parameters based on the current and/or past inventory modifications, and may transmit information defining the altered variable polling parameters to one or more of the RFID tag readers 106. The RFID tag readers 106 are configured to conduct future polling operations in accordance with the variable polling parameters received from the inventory monitoring controller 102. As will be described in more detail below, the inventory monitoring controller 102 may alter the variable polling parameters on an RFID tag reader 106 basis, for groups of RFID tag readers 106, or for all RFID tag readers 106 at once, according to various embodiments.

Each RFID tag reader 106 is configured to detect the presence of any RFID tags 110 that are located within a detection range of the RFID tag reader 106 (e.g., ranges 108-1, 108-2, 108-3, 108-N, collectively ranges 108, FIG. 1), and to transmit RFID tag identifying information and SKU/product attribute for each detected RFID tag 110 to inventory monitoring controller 102. In an embodiment, RFID tag readers 106 and inventory monitoring controller 102 communicate wirelessly over RF communication links, although this is not a requirement. In an alternate embodiment, some or all of RFID tag readers 106 may communicate over wired connections with inventory monitoring controller 102. Either way, inventory monitoring controller 102 may be considered to be a remote processing system, with respect to RFID tag readers 106, in that inventory monitoring controller 102 is remotely located from RFID tag readers 106. In an alternate embodiment, the functionality of inventory monitoring controller 102 may be incorporated into one of the RFID tag readers 106.

According to an embodiment, system 100 supports at least two types of communications between inventory monitoring controller 102 and RFID tag readers 106: control information from inventory monitoring controller 102 to RFID tag readers 106; and RFID tag identifying information from RFID tag readers 106 to inventory monitoring controller 102. As will be described in more detail later, the control information may include variable polling parameters, which indicate the time, frequency, and/or duration of polling operations to be performed by the RFID readers 106. In addition or alternatively, when the polling parameters include polling antenna selections and polling antenna activation durations, the control information may indicate the selected polling antennas and/or the polling antenna activation durations for such antennas. As will also be described in more detail later, the RFID tag identifying information identifies RFID tags 110 that responded to a polling operation conducted by an RFID reader 106. The RFID tag identifying information enables the inventory monitoring controller 102 to adjust various operational parameters, including the variable polling parameters and the missing article detection thresholds previously discussed, among other things.

Prior to performing the various procedures discussed herein, the inventory monitoring system 100 is first deployed and activated. This includes establishing the inventory monitoring controller 102 and user interface 104 at a convenient location (e.g., a retail store office or other local or remote location), and distributing RFID tag readers 106 at various locations within the controlled area, which ensure that the detection ranges 108 of the RFID tag readers 106 cover the entire area within which it is desirable to detect RFID tags 110. For example, an RFID tag reader 106 may be attached or positioned on each rack, shelf, table, or rounder in the controlled area, or may be positioned so that its detection range 108 encompasses a physical area that may include multiple racks, shelves, tables or rounders. In addition, the controlled area is populated with articles to which RFID tags 110 are attached. The inventory monitoring controller 102 may then initiate one or more system-wide polling operations in order to create and maintain a version of the current inventory. Theoretically, the current inventory may be created in a single, system-wide polling operation. However, a more likely scenario may be that the current inventory is "built up" over a period of time through the conduction of multiple polling operations. Initiating the inventory creation process may include, for example, the inventory monitoring controller 102 transmitting initial polling parameters to the RFID tag readers 106. The RFID tag readers 106 each perform one or more polling operations in accordance with the initial polling parameters, and transmit RFID tag identifying information to the inventory monitoring controller 102 in response to each polling operation performed. The inventory monitoring controller 102 may then analyze the received RFID tag and SKU identifying information to create and maintain the current inventory.

Initial deployment of the inventory monitoring system 100 also may include performing a process to determine the locations of each of the RFID tag readers 106, and to relate those locations to the physical layout of the controlled area in which they are deployed. For example, location determination for the RFID tag readers 106 may be performed manually by an individual. More particularly, the individual may enter information into the system 100 (e.g., via user interface 104), which indicates the physical location of each RFID tag reader 106 within the controlled area. Various other embodiments of methods for determining the location of an RFID tag reader 106 are discussed in detail later in conjunction with FIG. 8.

During normal operations, each RFID tag reader 106 performs additional polling operations according to polling times that are determined and controlled by the inventory monitoring controller 102. In an embodiment, the inventory monitoring controller 102 may send a control signal to an RFID tag reader 106 to initiate each polling operation. In such an embodiment, the inventory monitoring controller 102 may send a polling time for a next polling operation to the RFID tag reader 106, for example, and the RFID tag reader 106 may initiate the next polling operation at the supplied polling time. The RFID tag reader 106 may then remain idle until it receives another polling time from the inventory monitoring controller 102. In an alternate embodiment, the inventory monitoring controller 102 may send a control signal to an RFID tag reader 106 that causes the RFID tag reader 106 to initiate one or multiple future polling operations. For example, the inventory monitoring controller 102 may send multiple polling times, a polling frequency, a time duration between polling operations, or another parameter that indicates when one or more future polling operations should be conducted. One or more of the RFID tag readers 106 may be battery-powered. In order to conserve battery power, the RFID tag readers 106 may be turned off almost completely between each poll (except for timing circuitry that enables the RFID tag readers 106 to "wake up" for the next scheduled polling operation). In such an embodiment, the RFID tag reader 106 may be incapable of receiving control signals from the inventory monitoring controller 102 between polling operations. Instead, the inventory monitoring controller 102 may provide control signals to provide the RFID tag readers 106 with parameters relating to future polls during the times when the RFID tag readers 106 are powered up (e.g., during a polling operation and/or in conjunction with the RFID tag reader 106 transmitting RFID tag identification information to the inventory monitoring controller 102).

As used herein, a "polling time" is an indication of a specific time and date at which an RFID tag reader 106 is to perform a polling operation. A "polling frequency" is an indication of a frequency at which an RFID tag reader 106 should conduct polling operations (e.g., once per hour or some other time duration), and a "time duration between polling operations" is an indication of an amount of time between initiation of consecutive polling operations (e.g., one hour or some other duration). In an embodiment, the polling parameters are considered to be "variable," in that they may be altered by the inventory monitoring controller 102 during the normal operational mode of the system 100.

By providing the polling parameters to the RFID tag readers 106, the inventory monitoring controller 102 may cause the RFID tag readers 106 to perform polling operations asynchronously (to avoid collisions). By causing the RFID tag readers 106 to perform the polling operations within a defined time period, the inventory monitoring controller 102 may obtain an accurate snapshot of the RFID tags 108 present in the controlled area at a given time, which may result in a more accurate depiction of the on-floor inventory. However, during times when inventory is not likely to change or when areas of low inventory-change activity exist, the inventory monitoring controller 102 may stagger the polling operations performed by the RFID tag readers 106 by causing the various RFID tag readers 106 to perform polling operations outside of a defined time period, in order to reduce the power consumption of the RFID tag readers 106, for example.

Figure 2:
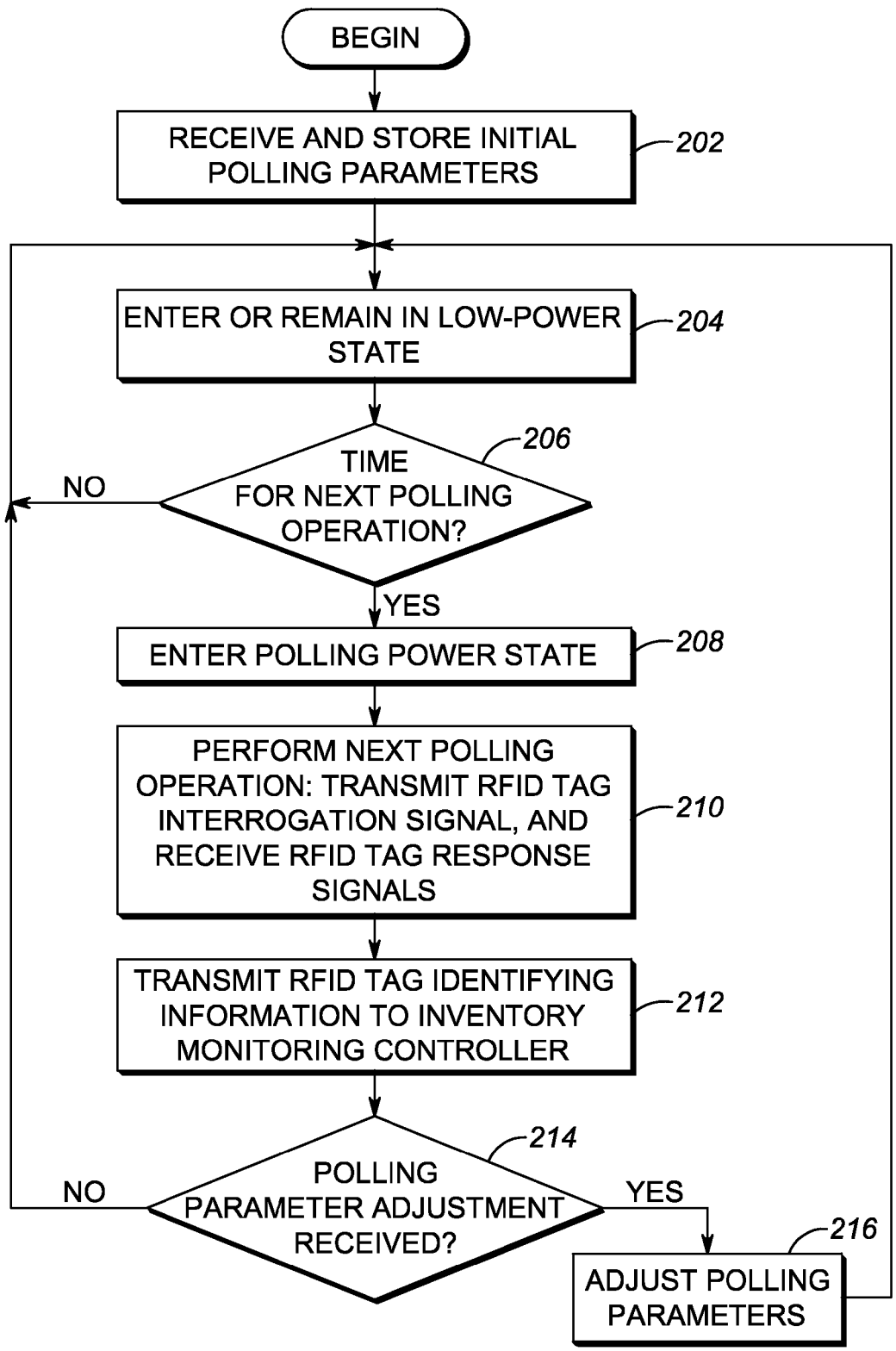
FIG. 2 is a flowchart of a method for an RFID tag reader to perform polling operations, in accordance with an example embodiment.

FIG. 2 is a flowchart of a method 200 for an RFID tag reader (e.g., RFID tag reader 106, FIG. 1) to perform polling operations, in accordance with an example embodiment. The method begins, in block 202, when the RFID tag reader receives and stores initial polling parameters. The initial polling parameters may be programmed manually into the RFID tag reader, or they may be received in a control signal from the inventory monitoring controller (e.g., inventory monitoring controller 102, FIG. 1). Either way, the initial polling parameters may be stored in local storage of the RFID reader (e.g., data storage 1008, FIG. 10). The polling parameters are "variable," in that the stored version of the polling parameters may be overwritten, in an embodiment, and as will be described in more detail below. Alternatively, polling parameters may be transmitted in real time from the inventory monitoring controller. Either way, polling parameters provided by the inventory monitoring controller may be packaged in a message specifically addressed to the RFID tag reader, in an embodiment, and transmitted by the inventory monitoring controller at appropriate times (e.g., at times when the RFID tag reader is powered up, such as in conjunction with a particular polling operation). Alternatively, the RFID tag reader may either request polling parameters at various times or may indicate its ability to receive polling parameters, at which time the inventory monitoring controller may send the polling parameters to the RFID tag reader.

According to various embodiments, the initial polling parameters may include one or more polling times, a polling frequency, and/or a time duration between polling operations. For example, the initial polling parameters may include a single, future time (e.g., 08:00 am) at which the RFID tag reader is to perform a first polling operation. Alternatively, the initial polling parameters may comprise a "polling schedule", which indicates that the RFID tag reader is to perform polling operations at multiple future times (e.g., 08:00 am, 09:00 am, 10:00 am, and so on). As yet another example, the initial polling parameters may indicate a future time (e.g., 08:00 am) at which the RFID tag reader is to perform a first polling operation, and a polling frequency (e.g., one poll per hour) or a time duration between polling operations (e.g., one hour). The above-given times, frequency, and duration are for example purposes only, and the initial polling parameters may specify different times, frequencies, and/or durations, as well.

In addition or alternatively, in an embodiment in which an RFID tag reader includes multiple polling antennas (e.g., antennas 1016, FIG. 10), the initial polling parameters may include an identification of one or more of the polling antennas to be used during the polling operations and/or antenna activation durations for such antennas. The inclusion of multiple polling antennas in an RFID tag reader may provide better diversity and higher accuracy during the polling operations. For example, when a polling antenna of an RFID tag reader has a particular horizontal polarization associated with it, and an antenna of an RFID tag has a polarization that is orthogonal to the RFID tag reader's polling antenna, the RF power transfer efficiency drops off significantly. Optimum power transfer occurs when there are 0 degrees between the polarizations of the RFID tag reader's polling antenna and the RFID tag's antenna (i.e., the two antenna polarizations are substantially aligned with each other), and the minimum power transfer occurs when there are about 90 degrees between the polarizations of the RFID tag reader's polling antenna and the RFID tag's antenna (i.e., the two antenna polarizations are substantially orthogonal to each other). Between those extremes, the one way power transfer may be described as being proportional to the square of the cosine of the angle between the respective polarization orientations. In the case of the RFID tags, the received power by the RFID tag's antenna is proportional to the fourth power of the cosine of the angle, because the signal is traveling forward and back.

In order to maximize the likelihood of an acceptable level of power transfer between an RFID tag reader and randomly oriented RFID tags, an embodiment of an RFID tag reader includes multiple polling antennas (e.g., polling antennas 1016, FIG. 10), each with a different polarization. Because there are three possible linear polarizations aligned along the Cartesian axes, each one orthogonal to the other two directions, an embodiment of an RFID tag reader may include three antennas, each one aligned along one of the three Cartesian axes. According to an embodiment, in the context of a polling operation, the polling antennas are turned on one at a time in order to avoid conflicts between the signals.

According to yet another embodiment, an RFID tag reader may include more than one polling antenna associated with each polarization in order to provide additional diversity. For example, due to multiple signal paths, there may be nulls in certain positions (i.e., positions in which the power transmission is significantly lower due to destructive interference of the radio waves). In order to minimize the negative effect of such fading, an embodiment includes at least two polling antennas associated with each polarization, where these antennas are slightly displaced from each other in the RFID tag reader. By implementing such an embodiment, the likelihood is significantly decreased that a specific RFID tag antenna will be located in a fade region of both RFID tag reader polling antennas. Accordingly, the probability of successful transmission by one or the other polling antenna may be greatly increased.

According to an embodiment, the system is capable of monitoring which of the polling antennae are able to read the RFID tags. Based on this information, the system may choose to turn on one or more of the available polling antennas within an RFID tag reader for relatively longer periods of time, while turning on others of the available polling antennas for relatively shorter periods. In some cases, it may be beneficial to turn one or more of the polling antennas off completely. For example, in a scenario in which all the RFID tags are oriented in a specific polarization, the system may cause the RFID tag reader to turn on one or more polling antennas that are transmitting in the specific polarization, while turning off one or more polling antennas that are transmitting in other polarizations. Alternatively, when the system determines that a particular polling antenna is detecting very few or no unique RFID tags, the system may cause the RFID tag reader either to turn on the particular polling antenna for a relatively shorter duration or less frequently, when compared with other ones of the RFID tag reader's polling antennas. This latter embodiment enables the RFID tag reader to continue to detect when some of the RFID tags may have been moved into a position that is amenable to being detected by the polling antennas that are activated for relatively shorter durations and/or less frequently.

Referring again to FIG. 2, assuming the next polling time is not imminent, in block 204, the RFID tag reader optionally enters a low-power state, in an embodiment. If the RFID tag reader already is in a low-power state, then the RFID tag reader remains in that state. Entry into the low-power state may include powering down or reducing power provision to some or all electrical components that are not needed either to communicate with the inventory monitoring controller or to determine whether a next polling time is imminent. For example, the RFID reader may depower components associated with performing a polling operation (e.g., RFID radio 1006, FIG. 10), various portions of non-volatile memory (e.g., data storage 1008, FIG. 10), and portions of its processing system (e.g., processing system 1002, FIG. 10) not associated with inventory monitoring controller communications or polling time monitoring, while allowing other components associated with inventory monitoring controller communications or polling time monitoring to remain powered (e.g., portions of processing system 1002, power module 1010, and/or real-time clock 1012, FIG. 10). In another embodiment, virtually all electrical components may be depowered in the low-power state, except for a real-time clock (e.g., real-time clock 1012, FIG. 10), which is capable of re-activating the RFID tag reader at a pre-specified time (e.g., just prior to a next polling time). In such an embodiment, the RFID tag reader would not be capable of communicating with the inventory monitoring controller until the real-time clock initiates re-activation of the rest of the system.

To enter the low-power state, all non-essential components may be depowered simultaneously. In an alternate embodiment, the low-power state may be optimized by depowering components in a more customized manner. For example, the RFID radio (e.g., RFID radio 1006, FIG. 10) may be powered up only for those short durations of time when a polling process is being performed, and may be powered down during all other times (e.g., including times when the RFID tag reader is communicating with the inventory monitoring controller). Implementation of a low-power state is desirable, particularly in embodiments in which the RFID tag reader is battery powered. More particularly, implementation of a low-power state enables the RFID reader to consume less power during periods between polling operations, thus enabling the RFID reader to operate in a power-efficient manner. In an alternate embodiment, a low-power state is not implemented, and blocks 204 and 208 (described later) may be excluded.

In block 206, a determination is made whether a time for a next polling operation has arrived or is imminent. In an embodiment, this includes a real-time clock (e.g., real-time clock 1012, FIG. 10) of the RFID tag reader comparing a current time with a "wake-up" time that is accessible to the real-time clock (e.g., stored in the real-time clock's memory), where the wake-up time coincides with the polling parameter for the next polling time. According to an embodiment, the real-time clock has access to a data storage location (e.g., a non-volatile portion of data storage 1008, FIG. 10) that includes information indicating times for one or more next polling operations. When the stored polling parameter specifically indicates the next polling time, the RFID tag reader may merely compare the next polling time with the current time and, when they are equal (or within a pre-specified time period of each other), the RFID tag reader may determine that the time has arrived for the next polling operation. In another embodiment, when the stored polling parameter indicates a polling frequency or a time duration between polling operations, the RFID tag reader may determine whether the current time indicates that the stored time duration has elapsed (or whether a time duration calculated based on the stored polling frequency has elapsed). If so, then the RFID tag reader may determine that the time has arrived for the next polling operation. When the time for the next polling operation has not arrived or is imminent, the method iterates as shown.

When the time for the next polling operation has arrived or is imminent, the RFID tag reader optionally enters a polling power state, in block 208, in an embodiment. Entry into the polling power state may include powering up or increasing power provision to some or all electrical components that are needed to perform a polling operation and which had previously been placed in a low-power state (e.g., in block 204). For example, the RFID reader may power up components associated with performing a polling operation (e.g., RFID radio 1006, FIG. 10), various portions of non-volatile memory (e.g., data storage 1008, FIG. 10), and portions of its processing system (e.g., processing system 1002, FIG. 10).

In block 210, the RFID tag reader performs a next polling operation at the time at which the variable polling parameters indicate that the RFID tag reader is to perform the next polling operation. When the polling parameters polling antenna selections and/or antenna activation durations for such antennas, the RFID tag reader performs the next polling operation using the selected polling antennas, with each selected polling antenna being activated for a default duration or a duration that may be specified as another polling parameter.

In an embodiment, each inventory polling operation includes the RFID tag reader executing an RFID tag detection algorithm. Essentially, the RFID tag detection algorithm includes the RFID tag reader transmitting an RFID tag interrogation signal, and monitoring for RFID tag response signals. More specifically, in the context of a polling operation, the RFID tag reader executes an RFID tag detection algorithm. The particular RFID tag detection algorithm depends on the type of RFID tag employed in the system. For example, in various embodiments, the RFID tag detection algorithm is configured to cause the RFID tag reader to communicate with an RFID tag selected from a group consisting of an active RFID tag, a passive RFID tag, and a battery-assist passive RFID tag. Each of these types of RFID tags includes an integrated circuit for storing information (e.g., an article or tag identifier), processing RFID tag interrogation signals from an RFID tag reader, and transmitting an RFID tag response signal that includes the stored information. An RFID tag also may be programmable to store the transaction status of an article (i.e., whether the article is "transacted" (paid-for and sold) or "non-transacted" (not yet paid for or sold)). When an RFID tag initially is attached to an article and offered for sale, the transaction status may be initialized to "non-transacted," and when the article is sold, equipment at the point-of-sale may be used to change the stored transaction status to "transacted." An active RFID tag includes a battery, and is capable of transmitting an RFID tag response signal autonomously. In contrast, a passive RFID tag does not include a battery, and requires an external source (e.g., an RFID tag reader) to provide power to the RFID tag via RF transmission, and to provoke RFID tag response signal transmission. A battery-assisted passive RFID tag, on the other hand, requires an external source to wake up, although it has a significant higher forward link capability, thus providing greater range. Unlike a fully active RFID tag, a battery-assisted passive RFID tag does not have a radio transmitter. Instead, a battery-assisted passive RFID tag backscatters a transmitted signal from an RFID tag reader. However, a battery-assisted passive RFID tag does not receive power for internal operations from the RF transmission from the RFID tag reader. Because the range of a passive RFID tag is typically limited by the "forward" power, a battery-assisted RFID tag usually has a longer range than a passive RFID tag.

According to an embodiment, the RFID tag detection algorithm includes invoking an RFID radio (e.g., RFID radio 1006, FIG. 10) of the RFID tag reader to transmit an RFID tag interrogation signal, and evaluating signals received by the RFID radio from RFID tags to determine whether they are valid RFID tag response signals. According to an embodiment, when one or more valid RFID tag response signals are received, the RFID tag reader is configured to transmit RFID tag identifying information, including SKU/product attribute for each responding RFID tag to the inventory monitoring controller, in block 212. For example, the information received in an RFID tag response signal may include an identifier that uniquely identifies each article (e.g., SKU/product attribute, a serial number, or other unique identifier of an article to which the responding RFID tag is attached) and/or the RFID tag response signal may be transmitted in a manner that enables a number of identical articles to be indicated (e.g., for a plurality of identical articles, RFID tag response signals may be transmitted in a time division multiplexed manner), and this information may be transmitted by the RFID tag reader to the inventory monitoring controller. Controller 102 then keeps a database of the current inventory (i.e., IDs all responding RFID tags), along with SKU/product attribute for each responding RFID tag. This information is used to build a historical database. As will be discussed below, historical tag read information along with SKU/product attribute can also be used to determine misplaced items, or suggest a location of items being stocked.

A particular polling operation may be performed that attempts to detect any and all types of RFID tags and/or articles that may be present within the controlled area, in an embodiment. In an alternate embodiment, article-specific polling operations may be performed, each of which may attempt to detect one or more RFID tags associated with a single article or a group of articles that comprises a subset of all articles. Either way, each polling operation performed by each RFID tag reader may be executed to produce unique RFID tag identifying information at each RFID tag reader, which each RFID tag reader may transmit to the inventory monitoring controller. In an embodiment, for a particular polling operation, an RFID tag reader transmits RFID tag identifying information that identifies all RFID tags and SKU/product attribute that the RFID tag reader detected during the polling operation. In another embodiment, the RFID tag reader may transmit only that RFID tag identifying information that indicates differences in detected RFID tags from previously reported RFID tag identifying information (e.g., RFID tag identifying information sent to the inventory monitoring controller after a prior polling operation).

After transmitting the RFID tag identifying information to the inventory monitoring controller, the polling operation is complete. As will be described in more detail in conjunction with FIGS. 3-6, the inventory monitoring controller may use the received RFID tag identifying information from one or more RFID tag readers to alter operational parameters of the system (e.g., variable polling parameters, missing article detection thresholds, misplaced article detection, intended location calculation of the articles, and so on).

According to an embodiment, the inventory monitoring controller may transmit control signals indicating adjustments to the variable polling parameters upon receipt of the RFID tag identifying information from the RFID tag reader. In another embodiment, adjustments to the variable polling parameter may be determined by the RFID tag reader. Either way, the information indicating the adjustments may be considered to be "obtained" by the RFID tag reader. Accordingly, in block 214, a determination is made whether information indicating an adjustment to the variable polling parameters has been obtained by the RFID tag reader (e.g., received from the inventory monitoring controller or determined by the RFID tag reader). In an embodiment, the information indicating the adjustment may include an updated version of the variable polling parameters (e.g., a new, next polling time, a set of new polling times, a new polling frequency, a new duration between polling operations, a new set of polling antennas, and/or new durations for polling antenna activation). Alternatively, the information indicating the adjustment may include values indicating a change to previously-provided and stored polling parameters (e.g., differences in a previously stored polling time or times, polling frequency, duration between polling operations, polling antenna selection, and/or polling antenna activation duration). When the polling parameter adjustment includes an updated version of the variable polling parameters, then the previously stored version of the variable polling parameters may be adjusted by overwriting the previously stored version of the variable polling parameters with the updated version of the variable polling parameters, in block 216. Otherwise, when the polling parameter adjustment includes values indicating one or more changes to previously stored polling parameters, the RFID tag reader may calculate new values for the variable polling parameters based on the indicated changes, and may adjust the variable polling parameters by overwriting the variable polling parameters with the newly calculated values, in block 216. Either way, the information indicating times for one or more next polling operations may be written into a data storage location (e.g., a non-volatile portion of data storage 1008, FIG. 10). This information is made accessible to a real-time clock (e.g., real-time clock 1012, FIG. 10), which is configured to initiate entry into a polling power state (e.g., in conjunction with block 208), in an embodiment. Upon storing any updated polling parameters, the method may then iterate as shown. In alternate embodiments, the inventory monitoring controller may transmit information indicating adjustments to the variable polling parameters at other times, and blocks 214 and 216 may be performed at other times, as well.

Figure 3:
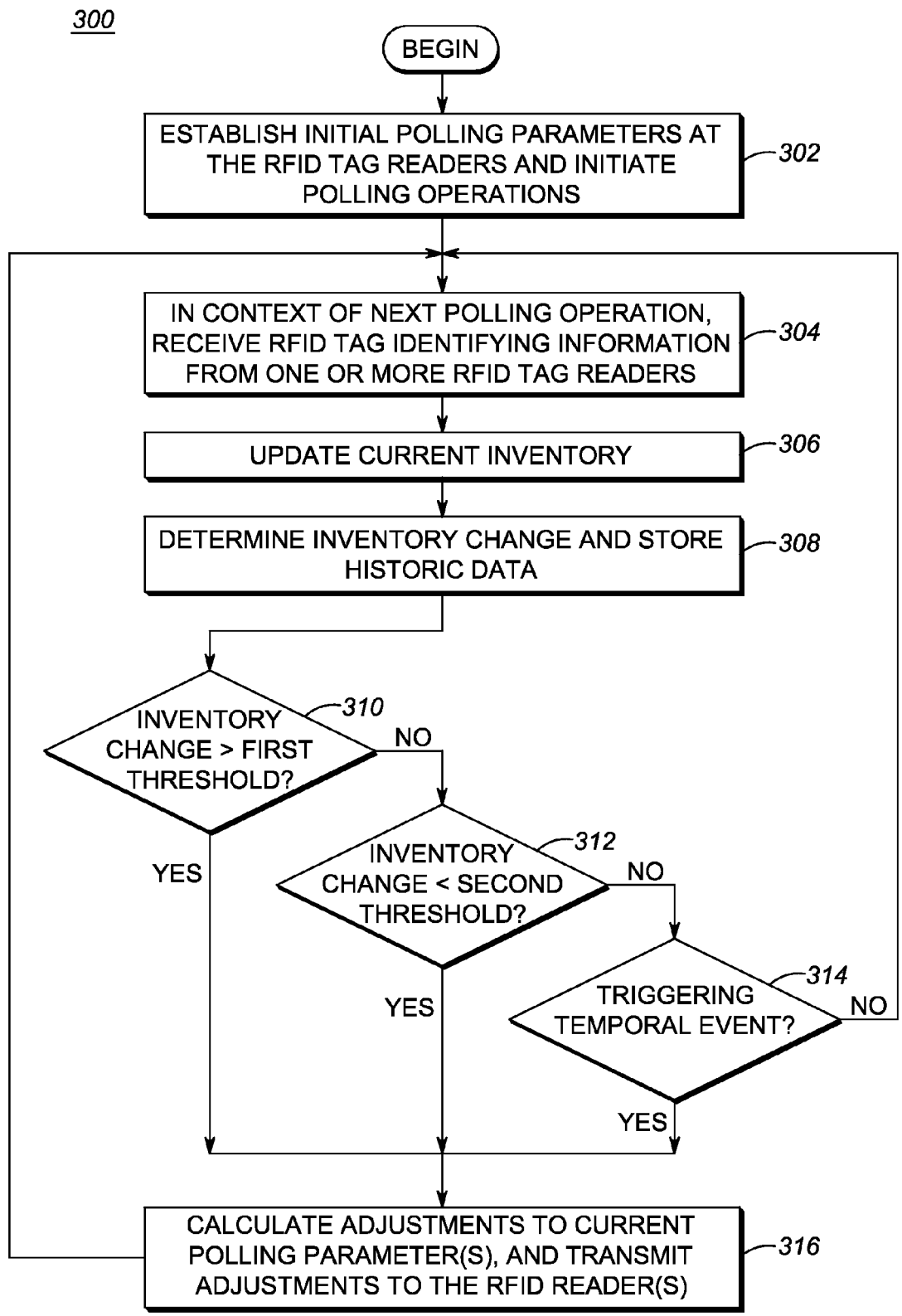
FIG. 3 is a flowchart of a method for an inventory monitoring controller to maintain a database of current inventory and to alter variable polling parameters, in accordance with an example embodiment.

FIG. 3 is a flowchart of a method 300 for an inventory monitoring controller (e.g., inventory monitoring controller 102, FIG. 1) to maintain a database of current and historical inventory and to alter variable polling parameters, in accordance with an example embodiment. As will be explained in more detail below, the inventory monitoring controller may alter the variable polling parameters in response to one or more triggering events, which may include various temporal events and/or indications of relatively-high or relatively-low inventory-change activity within the controlled area (e.g., during times of relatively-high or relatively-low sales activity). This enables the system to maintain an accurate estimate of the current inventory while reducing the overall power-consumption of the RFID tag readers.

The method may begin, in block 302, when the inventory monitoring controller initiates system-wide polling operations in order to generate and update an estimate of the current inventory (e.g., the inventory monitoring controller populates and updates a current inventory database). The database of current inventory may be stored at the inventory monitoring controller (e.g., in data storage 906, FIG. 9), in an embodiment, or the database of current inventory may be maintained elsewhere (e.g., at a separate database server). Either way, the database of current inventory is intended to reflect an accurate estimate of the articles that are currently present in the controlled area. In an embodiment, article or tag identifiers initially may be manually entered into the current inventory. Alternatively, the inventory monitoring controller may initiate one or multiple system-wide polling operations in order to create and update the current inventory, which ideally includes an indication of all of the articles within the controlled area.

As described previously, to initiate a system-wide polling operation, the inventory monitoring controller may transmit initial polling parameters to the RFID tag readers (e.g., RFID tag readers 106, FIG. 1), in an embodiment. Alternatively, the initial polling parameters may be manually programmed into the RFID tag readers. Either way, the initial polling parameters indicate one or more times at which the RFID tags should perform polling operations. As also discussed previously, the RFID tag readers each perform polling operations in accordance with the initial polling parameters, and transmit RFID tag identifying information to the inventory monitoring controller. The inventory monitoring controller may then analyze the received RFID tag identifying information from all of the RFID tag readers to update the current inventory. For example, the inventory monitoring controller may maintain a list of articles corresponding to all received RFID tag identifying information, and may delete redundantly reported articles reflected in the RFID tag identifying information (e.g., when multiple RFID tag readers reported detection of the same RFID tag). The current inventory status of all responding RFID tags (the current inventory) is time stamped and stored in a database. It should be noted that any prior inventory status is not deleted at this point, but is used when performing an analysis of historical inventories.

The inventory monitoring controller causes the RFID tag readers to perform multiple polling operations, where each subsequent polling operation is time stamped and stored, and is used to validate and/or update the current inventory and to ensure that all RFID tags within the controlled area are detected reliably. Each polling operation may be less than 100% accurate. Accordingly, to achieve higher accuracy, the system integrates the RFID tag identifying information obtained during multiple polling operations.

During a normal operational mode, an embodiment of which is depicted in blocks 304-316, the RFID tag readers perform polling operations in accordance with the their stored polling parameters (e.g., in accordance with the polling time(s), polling frequency, time duration between polling operations, polling antenna selections, and/or polling antenna activation durations stored at the RFID tag readers), and may report RFID tag identifying information to the inventory monitoring controller in conjunction with each polling operation. In the context of each polling operation performed by the RFID tag readers, the inventory monitoring controller receives RFID tag identifying information from the RFID tag readers, in block 304. For example, when multiple RFID tag readers perform a polling operation, the received RFID tag identifying information may include information transmitted by multiple RFID tag readers. Generally, the RFID tag readers perform the polling operations asynchronously in order to avoid collisions among the RFID tag readers. In some cases, such as when the RFID tag readers are located relatively far from each other (e.g., the RFID tags being polled are within range of only a single RFID tag reader), the RFID tag readers may perform the polling operations synchronously, as the likelihood of collisions may be negligible or non-existent.

The inventory monitoring controller may use the received RFID tag identifying information to update the current inventory, in block 306. Updating the current inventory, which will be described in more detail later in conjunction with FIG. 5, essentially includes determining whether an article is deemed to be missing, and when it is, removing the article from the current inventory. In addition, updating the current inventory includes adding back articles to the current inventory that were previously removed for failure to detect the RFID tag for the article, but which subsequently are detected. Accordingly, a "new" inventory is created by updating the current inventory (i.e., adding and removing articles from the current inventory). The time-stamped previous inventory is still stored and accessed when performing historical inventory analysis.

In block 308, the inventory monitoring controller determines an inventory change, in an embodiment. In an embodiment, the inventory change is calculated to be a difference between the current inventory and the new inventory. Because each of the RFID tags may identify a particular article, the inventory change can be specified in terms of identities of the articles that are being removed from the current inventory and the articles that are being added (or re-added) to the current inventory. In addition or alternatively, the inventory change can be quantified (e.g., represented with a value). For example, determining the inventory change may include determining a difference (e.g., in number of articles) between the previous version of the current inventory and the updated version of the current inventory. In other words, the inventory change may be a value reflecting the number of articles that were deleted from the current inventory in block 306 in response to the RFID tag identifying information received from the RFID tag readers in block 304. In an alternate embodiment, the inventory change may be a value reflecting a sum total of the number of articles that were deleted from the current inventory plus the number of articles that were added back into inventory. In still another alternate embodiment, the inventory change may be a value reflecting the number of articles that were deleted from the current inventory minus the number of articles that were added back into inventory. Other values reflecting the inventory change may be determined, as well, and the above examples are not meant to be limiting.

As mentioned above, in an embodiment, the inventory monitoring controller stores historical data, which reflects inventory changes that have been determined over time. The historical data may be represented in terms of inventory changes, raw polling data and SKU/product attribute as reported by the RFID tag readers, and/or other information that reflects a history of the inventory or the inventory changes. As will be explained in more detail later in conjunction with block 314 and FIG. 4, this historical data may be used to define temporal events that may trigger adjustments to the polling parameters, and may serve to determine misplaced items, or suggest possible location(s) for the misplaced items or new items being stocked. In addition, the historical data reflecting prior inventory changes may be used to calculate adjustments to operational parameters, in an embodiment. Accordingly, the term "inventory change," as used herein, may be based on a single inventory change calculation, a net inventory change over a period of time (e.g., which may be based on a most recent inventory change calculation and historical inventory changes), a net inventory change over a number of inventory change calculations (e.g., which may be based on a most recent inventory change calculation and a pre-determined number of historical inventory changes), and/or a net inventory change over a number of polling operations. Because an "inventory change" may, in some embodiments, be determined based on contemporary (e.g., most recently calculated) and historical inventory change calculations, such an inventory change may be considered to be determined based on contemporary (e.g., most recently received in conjunction with most recent polling operations) and historical (e.g., previously stored in conjunction with prior polling operations) RFID tag identifying information. In yet another embodiment, the system may calculate differences between two or more consecutive, system-wide polling operations. When the difference between a predefined number of polling operations is relatively small (e.g., less than a predetermined threshold), then the system may reduce the frequency of polling operations. Conversely, when the difference between a predefined number of polling operations is relatively large (e.g., greater than a predetermined threshold), then the system may increase the frequency of polling operations.

Once the inventory change has been determined, the inventory monitoring controller may initiate an adjustment to an operational parameter (e.g., a variable polling parameter and/or a missed item detection threshold) in response to the occurrence of a triggering event. As will be described in more detail below, a triggering event may include the occurrence of a temporal event (e.g., as determined in block 314) or a determination that an inventory change, which is calculated based on the RFID tag identifying information, compares unfavorably to a threshold (e.g., the inventory change compares unfavorably with a first threshold as determined in block 310 or with a second threshold as determined in block 312). In an embodiment, the inventory monitoring controller may determine whether each of the triggering events reflected in blocks 310, 312, and 314 occur. In alternate embodiments, the inventory monitoring controller may exclude determination of one or more (but not all) of the triggering events reflected in blocks 310, 312, and 314. It is to be understood that blocks 310, 312, and 314 may be performed in any order and/or some or all of blocks 310, 312, and 314 may be performed simultaneously.

Assuming that the triggering event reflected in block 310 is performed, a determination may be made, in block 310, whether the inventory change equals or exceeds a first threshold (i.e., the inventory change "compares unfavorably" with the first threshold). For example, the first threshold may be a value reflecting a particular number of articles (e.g., 10 articles, 100 articles, and so on). Alternatively, the threshold may be a percent of the total number of items in the inventory, in an embodiment. When the inventory change compares unfavorably with the first threshold, it may indicate relatively high inventory-change activity. For example, relatively high inventory-change activity may occur during busy sales periods and/or when a significant number of articles are being added or removed from the sales floor by store personnel. In such a situation, maintenance of an accurate estimate of the current inventory may justify controlling the RFID tag readers to perform more frequent polling operations and/or to perform a next polling operation sooner than is reflected by the currently stored polling parameters in the RFID tag readers.

Accordingly, when the inventory change compares unfavorably with the first threshold, the inventory monitoring controller may calculate an adjustment to polling parameters currently stored in one or more RFID tag readers, and at appropriate times (e.g., when an RFID tag reader is capable of receiving transmissions from the inventory monitoring controller), the inventory monitoring controller may transmit the adjustment to a single RFID tag reader, a group of RFID tag readers, or all RFID tag readers of the system, in block 316, in an embodiment. The adjustment may be calculated based on the determined inventory change. Because the inventory change may reflect a single inventory change calculation or a net inventory change over time, in various embodiments, the adjustment may be considered to be calculated based on contemporary (e.g., most recently received) and/or historical (e.g., previously received and stored) RFID tag identifying information. The calculated adjustment, once implemented by an RFID tag reader, will cause the RFID tag reader to perform a next inventory polling operation at an earlier time than it would have without the adjustment. For example, if an RFID tag reader has stored polling parameters that indicate that the RFID tag reader is to perform a next polling operation at 9:00 am, the adjustment may cause the RFID tag reader to store new polling parameters that cause the RFID tag reader instead to perform the next polling operation at 8:45 am. The adjustment may be implemented by a polling parameter that reflects an earlier next polling time, an increased frequency for performing polling operations, and/or a decreased time duration between polling operations, in various embodiments. The calculated adjustment may, for example, be related to the magnitude of the inventory change. For example, when the inventory change is relatively large, the adjustment may cause the RFID tag reader to perform the next polling operation significantly earlier than would have been previously performed, and when the inventory change is relatively small (but still above the first threshold), the adjustment may cause the RFID tag reader to perform the next polling operation just slightly earlier. As described above, adjustments to the polling parameters may be made based on an evaluation of a single inventory change calculation (e.g., based on the results of a single polling operation) or multiple inventory change calculations that have been determined over time.

Referring back to block 310, when the inventory change does not compare unfavorably with the first threshold, a determination may be made, in block 312, whether the inventory change is equal to or less than a second threshold (i.e., the inventory change compares unfavorably with the second threshold), where the second threshold may be less than or equal to the first threshold, in various embodiments. As with the first threshold, the second threshold may be a value reflecting a particular number of articles (e.g., 0 articles, 10 articles, and so on). Alternatively, the threshold may be a percent of the total number of items in the inventory, in an embodiment. When the inventory change compares unfavorably with the second threshold, it may indicate relatively low inventory-change activity. For example, relatively low inventory-change activity may occur during very slow sales periods and/or during off-business hours. In such a situation, RFID tag reader power-consumption considerations may justify controlling the RFID tag readers to perform less frequent polling operations and/or to perform a next polling operation later than is reflected by the currently stored polling parameters in the RFID tag readers.

Accordingly, when the inventory change compares unfavorably with the second threshold, the inventory monitoring controller may calculate an adjustment to polling parameters currently stored in one or more RFID tag readers, and, at appropriate times, may transmit the adjustment to a single RFID tag reader, a group of RFID tag readers, or all RFID tag readers of the system, in block 316. The calculated adjustment, once implemented by an RFID tag reader, will cause the RFID tag reader to perform a next inventory polling operation at a later time than it would have without the adjustment. For example, if an RFID tag reader has stored polling parameters that indicate that the RFID tag reader is to perform a next polling operation at 9:00 am, the adjustment may cause the RFID tag reader to store new polling parameters that cause the RFID tag reader instead to perform the next polling operation at 10:00 am. The adjustment may be implemented by a polling parameter that reflects a later polling time, a decreased frequency for performing polling operations, and/or an increased time duration between polling operations, in various embodiments. Again, the calculated adjustment may, for example, be related to the magnitude of the inventory change. For example, when the inventory change is relatively large (but still under the second threshold), the adjustment may cause the RFID tag reader to perform the next polling operation just slightly later than would have been previously performed, and when the inventory change is relatively small or zero, the adjustment may cause the RFID tag reader to perform the next polling operation significantly later.

Referring back to block 312, when the inventory change does not compare unfavorably with the second threshold and does not compare unfavorably with the first threshold (i.e., the inventory change is between the first and second thresholds), a determination may be made, in block 314, whether a triggering temporal event has occurred. When no triggering temporal event has occurred, the method iterates as shown. In an embodiment, a triggering temporal event may be a determination that the current time corresponds to one of a plurality of pre-determined, polling parameter adjustment times defined within a 24 hour period. In addition or alternatively, a triggering temporal event may be a determination that the current date corresponds to one of a plurality of pre-determined, polling parameter adjustment dates or date ranges defined within a period of time (e.g., a week, a month, a calendar year, and so on). For example, the inventory monitoring controller may maintain a list or table of triggering temporal events, which includes one or more times (defined within a 24 hour period) and/or dates (defined within a calendar year) at which adjustments to polling parameters should be made. Additionally, triggering temporal events may be defined on a weekly or monthly cycle. For example, triggering temporal events may be included in the list or table, which take into account that weekends may have increased retail activity (i.e., inventory changes) than are experienced on weekdays. In an embodiment, the triggering temporal events table also may include indications of polling parameter adjustments that should be made when a triggering temporal event occurs.

FIG. 4 is an example of a triggering temporal events table 400, in accordance with an embodiment. Table 400 includes a first column 402 corresponding to triggering temporal event times, dates, and date ranges, and a second column 404 corresponding to adjustments to variable polling parameters that should be implemented when an event in column 402 occurs. Table 400 includes a number of records 410, 411, 412, 413, 414, 415, and 416, each of which corresponds to a triggering temporal event. For example, record 410 corresponds to a triggering temporal event that occurs at 08:00 am each Monday (M), Tuesday (T), Wednesday (W), Thursday (TH), Friday (F), and Saturday (SA), which may correspond to an opening time of a retail store. Upon the occurrence of the triggering temporal event for record 410, table 400 indicates that a polling parameter adjustment should be made to set the polling frequency (PF) to once per hour. As another example, record 413 corresponds to a triggering temporal event that occurs at 09:00 PM on Monday-Saturday (e.g., the closing time of a retail store), at which time table 400 indicates that a polling parameter adjustment should be made to set the polling frequency to zero. Alternatively, record 414 corresponds to a triggering temporal event that encompasses a range of dates from December 1 through January 1 (e.g., the holiday season when retail sales activity typically is higher). When the current date is within this date range, table 400 indicates that a polling parameter adjustment should be made to increase a nominal polling frequency by 50%. For example, if a nominal polling frequency is once per hour (e.g., as indicated by the triggering temporal event associated with record 410), the polling frequency would be increased by 50% to 1.5 times per hour, or once every 40 minutes. Alternatively, the same objective could be achieved by establishing a first triggering temporal event, indicated by record 415, which causes the nominal polling frequency to be increased by 50% on December 1 and a second triggering temporal event, indicated by record 416, which causes the polling frequency to be decreased to its nominal value on January 1. It should be understood that the columns 402, 404, and example records 410-416 provided in table 400 are for example purposes only, and similar objectives could be achieved using a triggering temporal events table that includes more, fewer, and different types of information, in other embodiments. For example, times, days, and dates of triggering temporal events could be differently represented, and/or polling parameter adjustments could be specified in terms of polling times, polling frequencies, time durations between polling operations, specific values or percentages to increase or decrease polling times, frequencies, durations between polling operations, identities of selected polling antennas, polling antenna activation durations, and so on.

In addition, in various embodiments, a triggering temporal events table may be static or dynamic. In a static table embodiment, the triggering temporal events table may be created and stored in memory accessible to the inventory monitoring controller once, and the table may thereafter be non-modifiable. In a dynamic table embodiment, records within the table may be added, deleted, and/or modified after the table initially is stored. For example, a user may add, delete, and/or modify records within the table via the GUI provided by the system's user interface (e.g., user interface 104, FIG. 1). Alternatively, the system automatically may update the triggering temporal events table by adding, deleting, and/or modifying records within the table based on historical data reflecting inventory changes (e.g., historical data stored in block 308, FIG. 3). For example, if an analysis of the historical data performed by the inventory monitoring controller indicates that inventory changes are relatively large each business day between 05:00 pm and 07:00 pm, the inventory monitoring controller may add a record to the triggering temporal events table that causes the polling frequency to be increased each business day during this time range. Accordingly, the inventory monitoring controller may update the plurality of pre-determined, polling parameter adjustment times and/or the plurality of pre-determined, polling parameter adjustment dates reflected in the triggering temporal events table based on the historical data.

Referring back to FIG. 3 and block 314, when the inventory monitoring controller determines that a triggering temporal event has occurred (e.g., one of the temporal events specified in column 402, FIG. 4, has occurred), the inventory monitoring controller may calculate an adjustment to polling parameters currently stored in one or more RFID tag readers, and may transmit the adjustment to a single RFID tag reader, a group of RFID tag readers, or all RFID tag readers of the system, in block 316. The adjustment may correspond to a polling parameter adjustment associated with the triggering temporal event (e.g., a polling parameter adjustment specified in column 404, FIG. 4). The calculated adjustment, once implemented by an RFID tag reader, will cause the RFID tag reader to perform a next inventory polling operation at a different time than it would have without the adjustment (e.g., an earlier or a later time, depending on the nature of the adjustment).

As discussed previously, the "adjustments" transmitted by the inventory monitoring controller to the RFID tag readers may include the actual polling parameters (e.g., polling times, polling frequencies, time durations between polling operations, polling antenna selections, and/or polling antenna activation durations) and/or adjustments to previously stored polling parameters (e.g., differences in the polling times, polling frequencies, time durations between polling operations, polling antenna selections, and/or polling antenna activation durations). Polling parameters provided by the inventory monitoring controller may be packaged in a message specifically addressed to a particular RFID tag reader, in an embodiment, and may be transmitted by the inventory monitoring controller at appropriate times (e.g., when the inventory monitoring controller believes that an RFID tag reader that is the destination for the polling parameters is capable of receiving a transmission from the inventory monitoring controller). Alternatively, the RFID tag reader may either request polling parameters at various times or may indicate its ability to receive polling parameters, at which time the inventory monitoring controller may send the polling parameters to the RFID tag reader. After transmitting the polling parameter adjustments to one or more RFID tag readers in block 316, the method may iterate as shown in FIG. 3.

As mentioned previously, the inventory monitoring controller also may adjust an operational parameter that corresponds to a missing article detection threshold, in an embodiment. Adjustment of the missing article detection threshold may, for example, be conducted in conjunction with the process of removing articles from the current inventory (e.g., as performed in block 306) in response to received RFID tag identifying information. According to an embodiment, the inventory monitoring controller may remove a particular article from the current inventory when one or more consecutive polling operations by one or more RFID tag readers have failed to detect an RFID tag associated with the article. The number of consecutive "missed polls" (i.e., polling operations that have failed to detect the article's RFID tag) that trigger removal of the article from the current inventory is referred to herein as a "missing article detection threshold."

In various embodiments, the system may implement a single missing article detection threshold for all articles that are tracked in the current inventory, or the system may implement multiple missing article detection thresholds (e.g., distinct thresholds for types of articles or individual articles). By implementing missing article detection thresholds, the system avoids the situation of immediately removing an article from the current inventory if its RFID tag fails to be detected during a single polling operation (assuming that the missing article detection threshold is greater than one). Accordingly, if the article and its RFID tag are temporarily located in a position in which the RFID tag is undetectable by an RFID tag reader (e.g., in a dressing room, under a shelf, or behind an object that shields the RFID tag from being reliably detected), or if the article and its RFID tag are in an area in which communications with the RFID tag readers is unreliable (e.g., the RFID tag is located near the furthest range of an RFID tag reader), the system will not immediately remove the article from the current inventory. Instead, such a "potentially" missing article is declared to be missing only when a number of consecutive polls that equals or exceeds the article's missing article detection threshold have failed to detect the article's RFID tag (i.e., the number of consecutive polls compares unfavorably with the article's missing article detection threshold).

Initially, a "default" missing article detection threshold may be assigned to each article (e.g., 5 missed polls, or some other value). According to an embodiment, the system may dynamically adjust a missing article detection threshold for an article based on the number of erroneous determinations that the article has been declared to be missing. An erroneous determination that an article is missing is evident when an article that previously was declared missing, and thus removed from the current inventory, is later re-discovered through a detection of its RFID tag. In an embodiment, the system maintains an "error variable," which reflects the number of erroneous determinations that articles are missing. As will be explained in more detail in conjunction with FIG. 5, the system adjusts the missing article detection threshold based on the magnitude of the error variable, in an embodiment.

Figure 5:
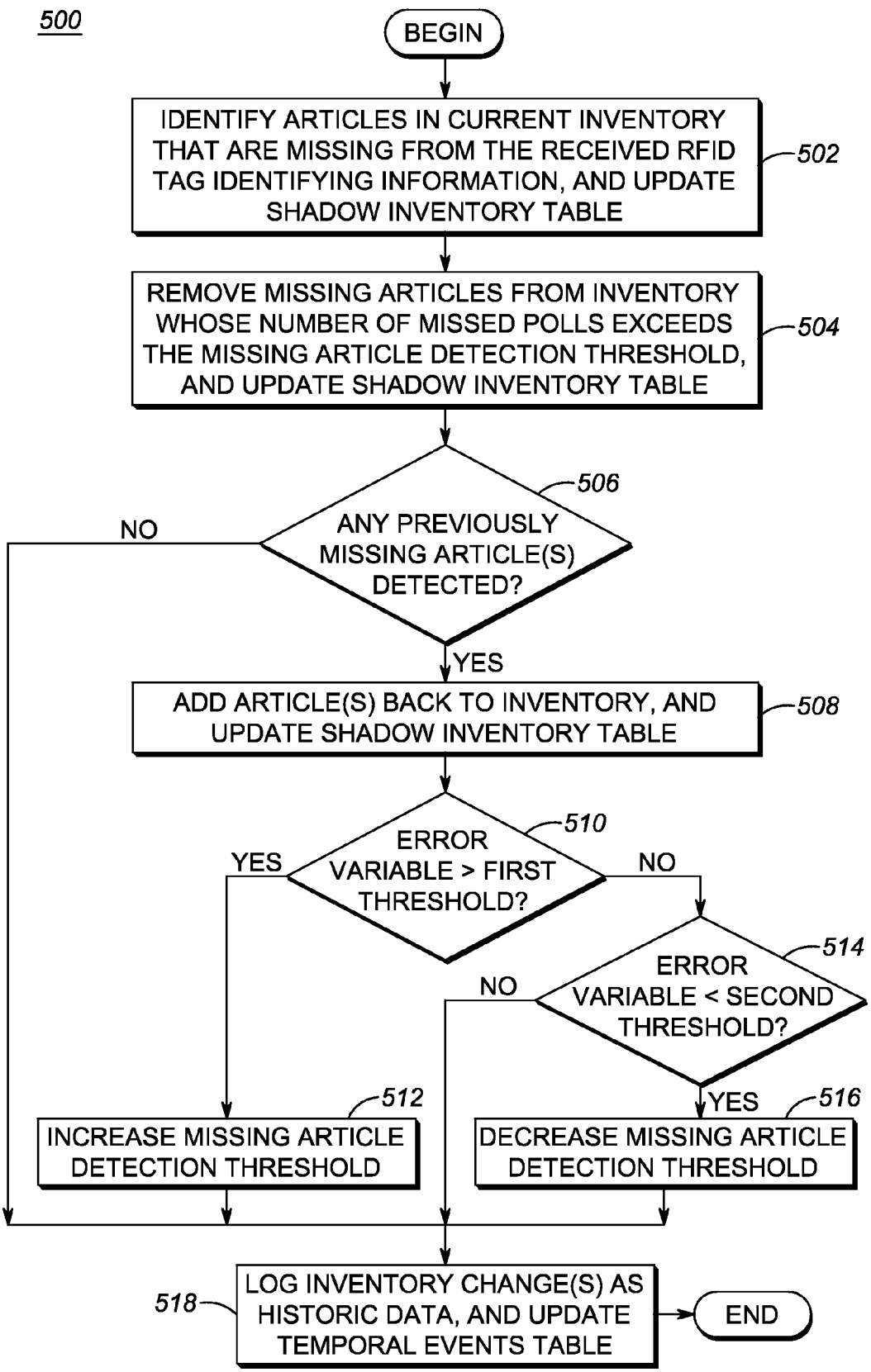
FIG. 5 is a flowchart of a method for an inventory monitoring controller to remove articles from an inventory database and to alter a missing article detection threshold, in accordance with an example embodiment.

FIG. 5 is a flowchart of a method 500 for an inventory monitoring controller (e.g., inventory monitoring controller 102, FIG. 1) to remove articles from a database of current inventory and to alter a missing article detection threshold, in accordance with an example embodiment. The method 500 may be implemented in the context of block 306, FIG. 3, for example, in which the inventory monitoring controller updates the current inventory based on RFID tag identifying information received from one or more RFID tag readers. Accordingly, the method 500 may begin after the inventory monitoring controller has received RFID tag identifying information from one or more RFID tag readers that have completed at least one polling operation. In other words, the method 500 may begin after the inventory monitoring controller has received RFID tag identifying information corresponding to a "system wide" polling operation (e.g., polling operations performed by multiple ones or all of the RFID tag readers of the system). In an embodiment, the set of RFID tag identifying information that corresponds to a system wide polling operation may include all RFID tag identifying information received from the RFID tag readers within a particular period of time (e.g., within an hour, a day, or some other period of time). Because each RFID tag reader may operate on a polling schedule that is different from the polling schedules of other RFID tag readers (e.g., each RFID tag reader may perform polling operations at a different times and/or different frequencies from other RFID tag readers), some RFID tag readers may perform multiple polling operations during the period of time, and other RFID tag readers may perform only a single polling operation during the period of time. Accordingly, in the context of a single system wide polling operation, some RFID tag readers may report RFID tag identifying information multiple times, and other RFID tag readers may report RFID tag identifying information only a single time. Desirably, the period of time would be long enough that each RFID tag reader would have an opportunity to report RFID tag identifying information (i.e., to perform at least one polling operation) within the period of time. In instances when an RFID tag reader has reported RFID tag identifying information multiple times in the context of a system wide polling operation (e.g., during the period of time corresponding to a system wide polling operation), the inventory monitoring controller may consider all reported RFID tag identifying information from that RFID tag reader, or only the most recently reported RFID tag identifying information, in various embodiments.

In another embodiment, the set of RFID tag identifying information that corresponds to a "system wide" polling operation may be defined to include at least one set of RFID tag identifying information from each RFID tag reader of the system. For example, during a single system wide polling operation, the inventory monitoring controller may wait to receive RFID tag identifying information from every RFID tag reader of the system before initiating the method 500 of FIG. 5. In such an embodiment, initiation of performance of the method 500 would be defined by the lowest polling frequency implemented by any RFID tag reader of the system.

In yet another embodiment, a "system-wide" polling operation may be considered to include polling operations performed by a particular subset of all of the RFID tag readers of the system (i.e., less than all of the RFID tag readers of the system), where the particular subset of RFID tag readers may be considered a "sub-system". For example, a sub-system may include a subset of RFID tag readers that cover or are in the vicinity of a specific area. In such a case, a "system-wide" polling operation may be considered to be complete as long as all of the RFID tag readers in the sub-system have conducted a polling operation.

In a specific embodiment, the method may begin, in block 502, by identifying one or more articles that are included in the current inventory that are missing from the received RFID tag identifying information (e.g., the RFID tag identifying information corresponding to a system wide polling operation), and thus that may be "potentially" missing. Identification of the potentially missing articles may be achieved by correlating the received RFID tag identifying information with the current inventory, and identifying any articles that are included in the current inventory but not reflected in the RFID tag identifying information as potentially missing. As mentioned above, an article is not necessarily declared to be missing and removed from the current inventory for failing to have its RFID tag detected during only a single polling operation. Instead, an article is declared to be missing and removed from the current inventory only when the RFID tag for the article has failed to be detected a threshold number of consecutive polling operations (e.g., a missing article detection threshold associated with the article). When an RFID tag for an article in the current inventory has initially failed to be detected by a polling operation, the article is declared to be "potentially" missing, and it is not necessarily removed from inventory immediately.

In an embodiment, the inventory monitoring controller maintains information relating to each article (including each potentially missing article and each previously-declared missing article) in a "shadow" list or table of articles (referred to below as a "shadow inventory table"), which may be separate from the current inventory database. In an alternate embodiment, the information regarding whether or not an article is declared missing or potentially missing may be incorporated into the article's record in the current inventory database (e.g., in additional fields). For purposes of clarity, the description below assumes a separate shadow inventory table is maintained to track the status of articles as recently detected (e.g., by the most recent, previous polling operation), potentially missing, or positively declared to be missing, although it is not a requirement to maintain a separate table. According to an embodiment, for a potentially missing article, the shadow inventory table may indicate each article's identity (e.g., its RFID, SKU, serial number, or other identifier), and for potentially missing articles, the table may keep track of how many consecutive polling operations have failed to detect the article. In addition, the table may indicate whether or not an article has been positively declared missing and removed from the current inventory. In an embodiment in which different missing article detection thresholds are maintained for groups of articles or for individual articles, the table also may indicate the missing article detection threshold for each article. Alternatively, as was mentioned previously, the system may maintain a single missing article detection threshold separately from the table. In addition, the system may maintain an error variable and a variable indicating of how many consecutive polls have been performed during which the RFID tag for a previously potentially missing article has been detected. Each of these values and indicators will be discussed in more detail below.

FIG. 6 is an example of a shadow inventory table 600, in accordance with an example embodiment. All of the information in table 600 may be considered to be "historical information," which may be used in the process of making various decisions, as described in more detail herein. Table 600 includes a first column 602 corresponding to an article identifier, a second column 603 corresponding to an indication of whether or not an article has been declared to be potentially missing, a third column 604 corresponding to a missing article detection threshold for an article, a fourth column 606 corresponding to a number of consecutive missed polls for an article, a fifth column 608 corresponding to an indication of whether or not an article has been declared to be missing (and thus removed from inventory), a sixth column 610 corresponding to an error variable, and a seventh column 612 corresponding to a number of consecutive polls that have been conducted during which the RFID tag for a previously potentially missing article has been detected. In order to add an article to the shadow inventory table, the inventory monitoring controller adds a record to the table (e.g., records 620, FIG. 6), and populates the record with the article's identifier (e.g., column 602), a "NO" indication for the potentially missing indicator (e.g., column 603), a missing article detection threshold (e.g., column 605, which initially may be populated with a default missing article detection threshold), a consecutive missed poll value of "0" (e.g., column 606), a "NO" indication for the declared missing indicator (e.g., column 608), and an error variable value (e.g., column 610, which initially may be populated with a default error variable value).

Table 600 includes a number of records 620, 621, 622, 623, 624, 625, each of which corresponds to an article being tracked in the table 600. Some articles (e.g., articles 621, 622, 624, 625) represent articles whose RFID tag has been detected during a most recent polling operation. Accordingly, these articles are not indicated to be "potentially missing" (as indicated by "NO" in the potentially missing article column 603 and the declared missing column 608). Other articles (e.g., articles 621, 622, 624, and 625) represent articles whose RFID tag has not been detected during one or more previous polling operations. For example, record 620 corresponds to an article identified by serial number "A00067" with a missing article detection threshold of "5," which has failed to be detected during a single, most recent, prior polling operation (as indicated by "YES" in the potentially missing article column 603 and "1" in the consecutive missed polls column 606). Because the most recent, prior polling operation failed to detect the article's RFID tag, the value in column 612 corresponding to the number of consecutive polls since the last miss has a value of "0." In addition, because the missing article detection threshold "5" is greater than the number of consecutive missed polls "1", record 620 indicates that the article has not been declared to be missing (as indicated by "NO" in the declared missing column 608). The missing article detection threshold of "5" may be a default value, for example. Similarly, the error variable value of "10" may be a default value, for example.

As another example, record 621 corresponds to an article identified by serial number "D21708" with a missing article detection threshold of "10," and an indication that the article has been detected during a most recent, prior polling operation (as indicated by "NO" in the potentially missing article column 603 and "0" in the consecutive missed polls column 606). The value of "1" in column 612 corresponding to the number of consecutive polls since the last miss indicates that the most recent, prior polling operation was the first to detect the article's RFID tag since either the article was added to the inventory or since the article was last indicated to be potentially missing. Assuming that the default value for the missing article detection threshold is "5" and the default error variable is "10", record 621 indicates that the system has increased the missing article detection threshold for article "D21708" to "10" and has increased the error variable value to "20". As will be described in more detail below in conjunction with blocks 506-512 of FIG. 5, the value in column 612 may be used to increase the error variable in column 610, and the error variable in column 610 may be used to increase the missing article detection threshold value in column 604, as is the case with record 621.

As yet another example, record 622 corresponds to an article identified by serial number "B07412" with a missing article detection threshold of "4," and an indication that the article has been detected during one or more, most recent, prior polling operations (as indicated by "NO" in the potentially missing article column 603 and "0" in the consecutive missed polls column 606, and a value of "60" in the polls since last miss column 612). The value of "60" in column 612 indicates that the most recent, 60 prior polling operations have detected the article's RFID tag since the article was either added to inventory or since the article was last indicated to be potentially missing. Assuming that the default value for the missing article detection threshold is "5" and the default error variable is "10", record 622 indicates that the system has decreased the missing article detection threshold for article "B07412" to "4" and has decreased the error variable value to "4". As will be described in more detail below in conjunction with blocks 506-516 of FIG. 5, the value in column 612 may be used to decrease the error variable in column 610, and the error variable in column 610 may be used to decrease the missing article detection threshold value in column 604, as is the case with record 622.

As yet another example, record 623 corresponds to an article identified by serial number "B55437" with a missing article detection threshold of "5" and an indication that the article has failed to be detected during "15" most recent, prior consecutive polling operations (as indicated by "15" in the consecutive missed polls column 606). Because the most recent, prior polling operation failed to detect the article's RFID tag, the value in column 612 corresponding to the number of consecutive polls since the last miss has a value of "0." In addition, because the number of consecutive missed polling operations compares unfavorably with the missing article detection threshold, the article has been declared to be missing (as indicated by "YES" in column 608). Accordingly, the article has been removed from the current inventory. In an embodiment, the record for the article is maintained in the shadow inventory table 600 for a period of time (or a number of additional polling operations), despite its having been previously removed from the current inventory. If the RFID tag for the article is later detected during a future polling operation, maintenance of the record enables the system to determine that an erroneous determination of the item as missing has occurred. Eventually (e.g., after a period of time or a number of future polling operations), the record may be deleted from the table 600.

Referring back to FIG. 5 and block 502, when an RFID tag for an article that is included in the current inventory has failed to be detected during a most recent polling operation, the inventory monitoring controller may update the shadow inventory table by incrementing the number of consecutive missed polls for the article in the shadow inventory table (e.g., the value in column 606). In block 504, the inventory monitoring controller may evaluate the potentially missing article information (e.g., the values in columns 603, 606) to identify articles having a number of consecutive missed polls that is greater than or equal to its corresponding missing article detection threshold. The inventory monitoring controller may then remove the identified articles from the current inventory. For example, the inventory monitoring controller may delete the record for the article from the current inventory database, in an embodiment. Alternatively, the inventory monitoring controller may provide an indication in the current inventory database that the article has been removed from the current inventory, while maintaining the actual record for the article at least for a time (in case the article is later re-added). In addition, the inventory monitoring controller may update the record for the article in the shadow inventory table to indicate that the article has been declared missing and has been removed from the current inventory (e.g., by providing a "YES" indicator in column 608, FIG. 6).

In block 506, the inventory monitoring controller also determines whether RFID tags for any articles that were previously declared to be missing have been detected during the polling operation. According to an embodiment, this determination may be made when the inventory monitoring controller receives, from an RFID tag reader, RFID tag identifying information for an RFID tag and article that is not identified in the current inventory. If another indication is present that the article previously had been in the current inventory, but had been removed (e.g., a record for the article with a "YES" missing indicator in column 608, FIG. 6, is present in the shadow inventory table, or a record is present in the current inventory database with an indication that the article had been removed), then the inventory monitoring controller may determine that the previously missing article has been detected. A determination that an article that was previously declared as missing has been detected is considered an "error", which relates to the "error variable," briefly mentioned above in conjunction with FIG. 6, and described in more detail below. If no previously missing article has been detected, the method proceeds to block 518, which will be described later.

If one or more previously missing articles have been detected, the inventory monitoring controller initiates the process of adding the article back into the current inventory, in block 508. According to an embodiment, the inventory monitoring controller adds the article back into the current inventory by adding a new record for the article in the current inventory database if none exists, or if the previous record for the article had been maintained with a "missing" designation, the article is added back into the current inventory by removing the "missing" designation. In addition to adding the article back into the current inventory, the inventory monitoring controller updates various values in the shadow inventory table (e.g., table 600, FIG. 6). This update may include increasing an error variable associated with the article, identifying the article as not potentially or actually missing, and resetting the values corresponding to a number of consecutive missed polls, and the number of polls since the article was previously declared to be missing (e.g., updating the values in columns 603, 606, 608, 610, and 612, FIG. 6).

For example, record 621 reflects a situation in which article "D21708" had previously been declared missing, but a most recent polling operation detected the RFID tag for the article. Accordingly, the inventory monitoring controller has indicated "NO" in the potentially missing column 603, reset the number of consecutive missed polls to "0", in column 606 (since the RFID tag for the article has just been detected), and has indicated in column 608 that the article is not missing. In addition, the inventory monitoring controller has updated the number of polls since the last missed poll as "1" in column 612. As mentioned previously, the error variable (e.g., in column 610) initially may be given a default value (e.g., "10"), and each time a discovery is made that the article had erroneously been declared missing (e.g., in block 506), the error variable may be increased for the article (e.g., incremented by one or more). Accordingly, assuming a default error variable value of "10" and an increment of one for each erroneous detection that the article is missing, the error variable value of "20" for article "D21708" indicates that the article previously had erroneously been declared as missing ten times. In an embodiment, the error variable may be increased to a pre-defined, upper limit (e.g., 20 or some other positive value).

According to an embodiment, the error variable also may be incrementally decreased in situations in which an article has never been declared to be potentially missing, and/or in which an article previously declared to be potentially missing, has subsequently been declared not to be missing (e.g., when the article's RFID tag has been detected after having not been detected). For example, record 624 reflects a situation in which article "Z77662" had never previously been declared to be missing, and had been detected by 1207 of the most recent polling operations (e.g., as indicated in column 612). As another example, record 622 reflects a situation in which article "B07412" had previously been declared missing, but had later been detected by the 60 most recent polling operations (e.g., as indicated in column 612). According to an embodiment, the system decreases (e.g., decrements by one or more) the error variable for each N polls that have detected the article's RFID tag since the last missed poll for the RFID tag, where N may be any integer from 1 to an arbitrarily higher value (e.g., 10, 100, and so on). In an embodiment, the error variable may be decreased to a pre-defined, lower limit (e.g., 1 or some other positive value). For example, the system may decrement by one the error variable for each 10 polls that have detected the RFID tag for an article, since the last missed poll for that RFID tag. Accordingly, since 1207 of the most recent polling operations have detected the RFID tag for article "Z77662," the system has decremented the error variable to the pre-defined, lowest limit (e.g., from a default value of "10" to a decremented value of "1"). Similarly, since the 60 most recent polling operations have detected the RFID tag for article "B07412," the system has decremented the error variable six times (e.g., from a default value of "10" to a decremented value of "4"). Although not specifically indicated in FIG. 5, the process of decrementing the error variable may be performed at any time after receiving RFID tag identifying information from the RFID tag readers. For example, the process of decrementing the error variable may be performed during block 502 or any time before block 510 is executed.

Referring again to FIG. 5, after updating the error variables in block 508 (e.g., the values in column 610, FIG. 6), the error variables may be used to determine whether or not to adjust the missing article detection thresholds for one or more articles. According to an embodiment, this is achieved by comparing the error variables to one or more thresholds. When the error variable for an article is relatively high, this indicates that the RFID tag for the article is erroneously declared to be missing on a relatively frequent basis (e.g., the RFID tag may be located in an area at the edge of the detection ranges of the RFID tag readers or in an area that is partially shielded). In such a situation, it is desirable to increase the missing article detection threshold for that article so that the article is not erroneously removed from the current inventory. In an embodiment, the missing article detection may be increased to a pre-defined, upper limit (e.g., 20 or some other positive value). Conversely, when the error variable for an article is relatively low, this indicates that the RFID tag for the article has been reliably detected for a relatively large number of polling operations, indicating that it is unlikely that the system will fail to detect the RFID tag in the future. In this situation, it is desirable to decrease the missing article detection threshold for that article so that the article more rapidly will be removed from the current inventory if its tag fails to be detected in the future. In an embodiment, the missing article detection threshold may be decreased to a pre-defined, lower limit (e.g., 1 or some other positive value).

To implement the alteration of the missing article detection thresholds based on the error variables, a determination may be made, in block 510, whether the error variable for each article that had previously been declared missing equals or exceeds a first threshold (i.e., compares unfavorably with the first threshold), where the first threshold has a value that is greater than the default error variable value. For example, if the default error variable value is "10," the first threshold may have a value of "15" (or some other value higher than 10). When a determination is made that the error variable for an article compares unfavorably with the first threshold, then in block 512, the missing article detection threshold for the article is increased (e.g., incremented by one or some other value). Referring to record 621 (FIG. 6), for example, the error variable for article "D21708" has a value of "20". If the first threshold has a value of "15," then the error variable would have compared unfavorably with the first threshold five times, and execution of blocks 510 and 512 would have caused the missing article detection threshold to be incremented five times (e.g., from a default value of "5" to a value of "10", as is reflected in column 604 for article "D21708"). With a relatively high missing article detection threshold, the RFID tag for article "D21708" would need to be missed during relatively more consecutive polling operations than an article having a default missing article detection threshold. Accordingly, the system compensates for a more sporadically detectable RFID tag by increasing the number of consecutive polling operations that must fail to detect the RFID tag before the associated article is removed from the current inventory. Thus, the system is capable of more accurately maintaining an estimate of the current inventory.

Referring back to block 510, when a determination is made that the error variable for an article does not compare unfavorably with the first threshold, then another determination may be made in block 514, whether the error variable for an article equals or is less than a second threshold (i.e., compares unfavorably with the second threshold), where the second threshold has a value that is less than the default error variable value. For example, if the default error variable value is "10," the second threshold may have a value of "5" (or some other value lower than 10). When a determination is made that the error variable for an article compares unfavorably with the second threshold, then in block 516, the missing article detection threshold for the article is decreased (e.g., decremented by one or some other value). Referring to record 622 (FIG. 6), for example, the error variable for article "B07412" has a value of "4". If the second threshold has a value of "5," then the error variable would have fallen below the second threshold once, and execution of blocks 514 and 516 would have caused the missing article detection threshold to be decremented once (e.g., from a default value of "5" to a value of "4", as is reflected in column 604 for article "B07412"). With a relatively low missing article detection threshold, the RFID tag for article "B07412" would need to be missed during relatively fewer consecutive polling operations than an article having a default missing article detection threshold. Accordingly, the system compensates for a reliably detectable RFID tag, including an RFID tag that had previously been declared to be potentially missing, by decreasing the number of consecutive polling operations that must fail to detect the RFID tag before the associated article is removed from the current inventory. Again, with this feature, the system is capable of more accurately maintaining an estimate of the current inventory.

The above description of how the system may modify the error variable and the missing article detection threshold for a single article may be extended to modifying error variables and/or missing article detection thresholds for groups or classes or articles, in other embodiments. For example, when the error rate (e.g., the average error rate) for missing a particular class of articles falls below a predetermined threshold, then the system may assume that the missing article threshold for that class of articles is too high, and the system may reduce the missing article detection threshold, accordingly. Thus, by maintaining a predetermined error rate, the system may continually optimize the missing item threshold.

In block 518, the inventory monitoring controller logs, as historical information, some or all of the inventory changes (e.g., removals of articles from the current inventory or additions of articles to the current inventory) that may have been made during blocks 504 and 508. As described previously, this historical information may be analyzed in order to add, delete or modify triggering temporal events (e.g., triggering temporal events listed in table 400, FIG. 4). In a particular embodiment, the information may be used to update the triggering temporal events table to add, delete or modify records within the table. For example, when an analysis of the historical data indicates a time and/or date range of high activity with regard to adding and deleting articles from the current inventory, one or more records may be added to the triggering temporal events table to increase a polling frequency, for example. Conversely, when an analysis of the historical data indicates a time and/or date range of low activity with regard to adding and deleting articles from the current inventory, one or more records may be added to the triggering temporal events table to decrease a polling frequency, for example. In yet a further embodiment, the historical data representing the inventory changes may be evaluated to determine whether the historical data indicates a sustained pattern of the inventory changes over a defined number of polling operations or a defined time period. When the historical data does not indicate the sustained pattern of the inventory changes, updating the triggering temporal events table may be bypassed. The method may then end.

In addition to the above-described features provided by various embodiments, an inventory control system may provide additional features, in accordance with other embodiments. For example, but not by way of limitation, an embodiment of an inventory processing system (e.g., inventory processing system 100, FIG. 1) may be configured to occasionally or continually locate articles (or more specifically, to locate the RFID tags associated with articles). In such an embodiment, the system may cause a depiction of the inventory (e.g., a planogram) to be displayed (e.g., via user interface 104, FIG. 1). In yet another embodiment, an inventory processing system may be configured to indicate and/or determine the location of one or more particular RFID tags (e.g., any one or more of RFID tags 110, FIG. 1) within a controlled area based on a specific request from a user (e.g., a request made via user interface 104, FIG. 1).

Figure 7:
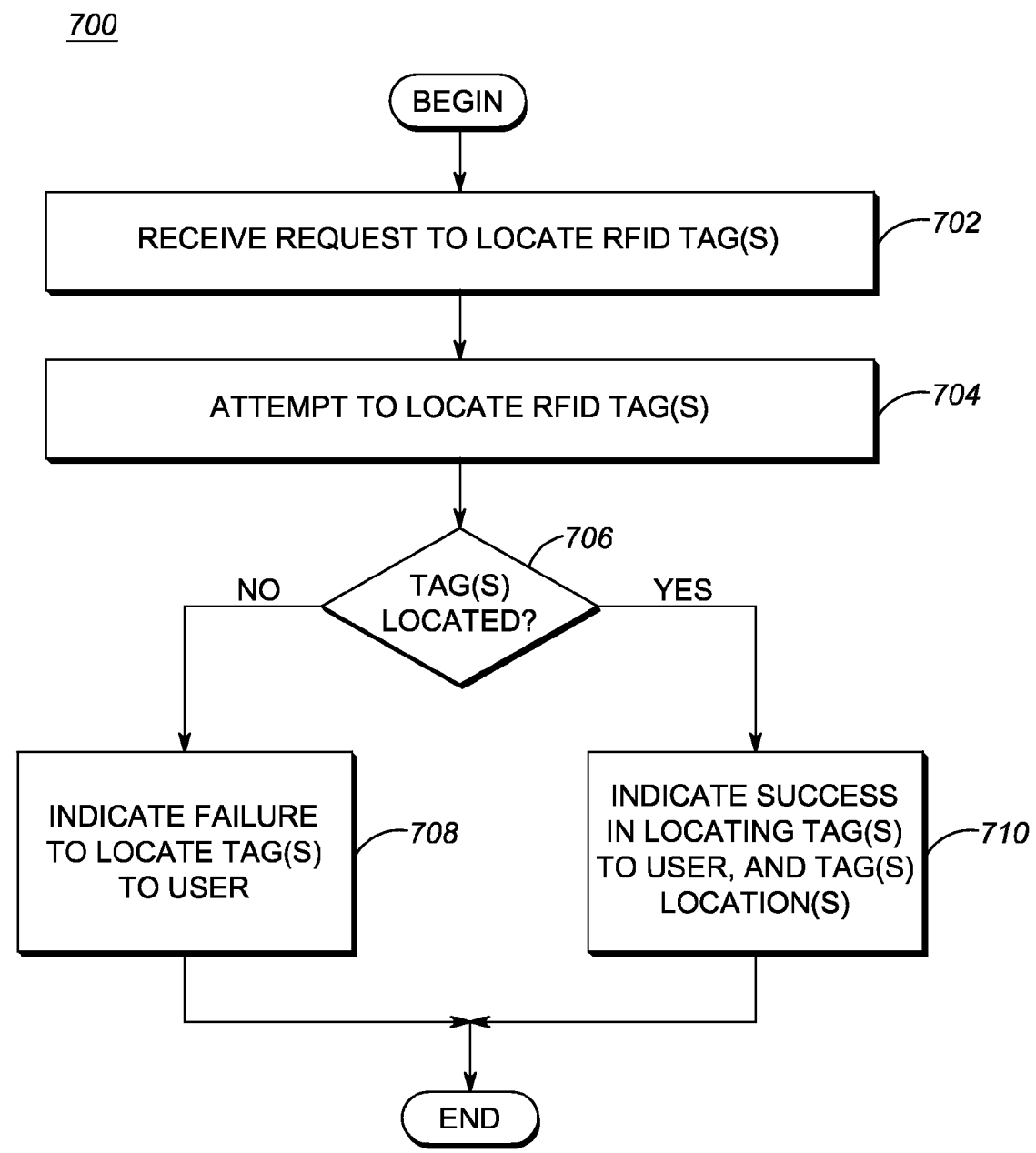
FIG. 7 illustrates a flowchart of a method for determining the location of a particular RFID tag, in accordance with an example embodiment.

FIG. 7 illustrates a flowchart of a method 700 for determining the location of a particular RFID tag, in accordance with an example embodiment. The method may begin, in block 702, by receiving an inquiry indicating a request to locate a particular RFID tag. For example, information defining the inquiry may be provided by a user via a user interface of the system (e.g., user interface 104, FIG. 1). For example, the user may indicate that the user desires the system to locate a particular RFID tag. Alternatively, the user may indicate that the user desires the system to locate a particular type of article (e.g., a particular shirt in a certain size), and the system may identify one or more RFID tags corresponding to the particular type of article from current inventory information. In an alternate embodiment, the RFID tag location determination process may be initiated based on an impetus other than a user-provided inquiry. For example, in an alternate embodiment, the system may occasionally or continually locate some or all detectable RFID tags without any specific request from the user, and may maintain location data for each detected RFID tag. In such an embodiment, the system may merely retrieve the location of the RFID tag (or multiple RFID tags) that is the subject of the request from the stored location data, and may provide information to the user indicating the location(s) of the RFID tag(s).

In another embodiment in which the system does not already have knowledge of the location of the particular RFID tag (or multiple RFID tags) that is the subject of the request, the system attempts to determine the location of the particular RFID tag (or multiple RFID tags), in block 704. This determination may be made in one or more of a variety of ways, according to various embodiments (e.g., one or a combination of multiple ones of the below-described article location determination methods may be employed to increase the accuracy or efficiency of locating a particular article). For example, in a first embodiment, the system may determine the location of the RFID tag(s) based on an evaluation of the location(s) of one or more RFID tag readers that detected the RFID tag(s). For example, if first, second, and third RFID tag readers each detected a particular RFID tag, the system may surmise that the RFID tag is located in an area corresponding to the intersecting detection ranges of the first, second, and third RFID tag readers. The number of RFID tag readers reporting the particular RFID tag determines the resolution to which the RFID tag location may be determined.

In another embodiment, the system may determine the location of the RFID tag(s) based on an evaluation of one or more received signal strength indication (RSSI) for signals emitted by the RFID tag(s), as reported by one or more RFID tag readers in the context of a normal polling operation (or a polling operation that may be initiated in response to the inquiry). For example, a first RFID tag reader may report that a particular RFID tag responded with a signal having an RSSI at a first level, and a second RFID tag reader may report that the same RFID tag responded with a signal having an RSSI at a second level. From this information, the system may determine that the RFID tag is located in an area where the detection ranges of the two reporting RFID tag readers overlap. In addition, given that the RSSI levels detected by the reporting RFID tag readers are inversely proportional to the distances between the RFID tag and each of the RFID tag readers, the system may calculate a closer approximation of the location of the RFID tag with respect to the RFID tag readers. For example, if the first RSSI level reported by the first RFID tag reader is relatively high, and the second RSSI level reported by the second RSSI tag reader is relatively low, the system may determine that the RFID tag is closer to the first RFID tag reader and farther from the second RFID tag reader. Although the above example describes two RFID tag readers reporting RSSI levels for signals from an RFID tag, RFID tag location determination based on RSSI levels may be performed using an RSSI level reported from just a single RFID tag reader, or using RSSI levels reported from more than two RFID tag readers. The number of RFID tag readers reporting RSSI levels for the particular RFID tag determines the resolution to which the RFID tag location may be determined.

In yet another embodiment, the system may determine the location of the RFID tag(s) based on a read frequency of one or more nearby RFID tag readers. More particularly, the location of a particular RFID tag may be more accurately estimated based on a percentage of recent polls during which each RFID tag reader detected the RFID tag. For example, if a first RFID tag reader detected the RFID tag during 100% of a number of most recent polling procedures, and a second RFID tag reader detected the RFID tag during only 20% of a number of most recent polling procedures, the system may determine that the RFID tag is closer to the first RFID tag reader than to the second RFID tag reader. Again, the number of RFID tag readers reporting the particular RFID tag determines the resolution to which the RFID tag location may be determined.

In still another alternate embodiment, the system may determine the location of the RFID tag(s) based on phase information. More specifically, the system may evaluate signal phase information as a function of frequency for multiple RFID tag readers that detect and report a particular RFID tag to determine the distance(s) between the multiple, reporting RFID tag readers and the RFID tag. Location determination using phase information may be even more accurate than location determination using other methods.

In still another alternate embodiment, a combination of the above methods (e.g., any two or three of the above methods) may be combined to provide even more refined location estimates for the RFID tags. Furthermore, since the system may perform inventory polls periodically on an ongoing basis, the data from many polls may be combined to minimize uncertainty in the location estimates, where the uncertainty may otherwise arise due to noise and other undesirable interference. Hence, the location estimates for the RFID tags may be continually improved with time.

A determination is made, in block 706, whether the location(s) of the RFID tag(s) were successfully identified. If not, then in block 708, the system may provide information to the user (e.g., via a displayed message on the user interface), which indicates that the RFID tag(s) were not successfully located, and the method may end. According to an embodiment, even when a most recent polling operation fails to identify a current location of the RFID tag(s) for which the search is being conducted, the system may indicate (e.g., display) a last known location of the RFID tag(s) (e.g., the system may display the last known location on a map or planogram with an indication (e.g., a different color) that the location information is not current). The system also may indicate a last time that the RFID tag(s) were detected at the indicated location.

If so, then in block 710, the system may provide information to the user indicating that the RFID tag(s) were successfully located (e.g., via a displayed message), and indicating location(s) of the RFID tag(s). For example, the location(s) of the RFID tag(s) may be indicated with a description of the location(s) (e.g., "top shelf of rack 5"), a description of the location of a nearby RFID tag reader, and/or an indication of the location(s) of the RFID tag(s) on a map displaying the location of the tags in the controlled area. The method may then end.

As mentioned above, embodiments of the above-described methods may be used to determine the location of a single RFID tag or multiple RFID tags. In another embodiment, the system may use the above-described techniques to determine articles that have been misplaced within the controlled area, and to indicate the locations of the misplaced articles. For example, the system may maintain knowledge of the intended locations and the actual locations of the various articles within its inventory (e.g., the shadow inventory table 600, FIG. 6, and/or the database of current inventory may include fields for each article that indicate not only an article identifier, but also an intended location for each article and an actual location for each article). According to an embodiment, the location information may be continually refined and updated as new polling information is obtained on a regular basis following the same algorithms described above. The system may use the above-described techniques to determine and indicate the actual locations of each of the articles of inventory, and may compare the actual locations with the intended locations. When the system determines that a specific article is not in its intended location (i.e., the article is "misplaced"), the system may provide an indication to that effect. For example, the system may generate a warning (e.g., via user interface 104, FIG. 1) to the user, in an embodiment. In a further embodiment, the system may cause information indicating the actual location and the intended location of an article to be displayed on a planogram that depicts the layout of the controlled area. For example, a misplaced article can be displayed in a manner that draws the attention of the user to the article (e.g., the misplaced article may be displayed in a different color from articles that are in their intended locations). The display may indicate the actual location of the article and the intended location of the article (e.g., with an arrow showing where the article should be returned to). According to an embodiment, the intended locations for the various articles of inventory may be specified via user input. Alternatively, the system may surmise that one or more articles of a certain kind are misplaced when a majority the articles are located in a certain area (e.g., on a certain shelf), and a minority of the articles are located in one or more different areas. When this occurs, the system may determine that the minority of the articles may be misplaced, and may provide an indication to that effect to the user. According to an embodiment, the user may have the option to override the system, thereby indicating an article's new intended location going forward. In some cases, an RFID tag reader may have been relocated or a display area (e.g., a shelf, rounder or rack) within range of the RFID tag reader may have been restocked with other articles, and a user may override any indication or warning provided by the system.

In another embodiment, the system may be configured to suppress or revise a misplaced article warning or indication when the system determines that more than a threshold percentage (or number) of the articles have been moved from an area and/or when the system determines that more than a threshold percentage (or number) of articles have been newly moved into an area, as such occurrences are likely to indicate restocking and/or display reconfiguration activities.

In yet another embodiment, controller 102 will learn associations about the intended location of an item based on its previous reads of that item or similar items (i.e., historical RFID tag responses). If the items being read at a particular area by the installed RF reader have the SKUs with some common information (e.g., they are from the same manufacturer and with certain style), controller 102 will mark that area as the intended location for that kind of SKU. In the future, if an RF reader installed at a different location within the retail floor reads an item with that SKU, controller 102 will determine that the item is misplaced and will raise an alarm for the store associates to suggest about the possible misplacement and the intended location of that item, which controller 102 has determined previously. So, for example, assume that an association has been determined that all ladies shoes are located within a first area of a store. In other words, the attribute "ladies shoe" from a SKU has always been found located in the first area. If, in the future, a SKU attribute "ladies show" is read for an item, and the item is not located within the first area of the store, the user may be notified of this fact.

In a situation where only one item is kept, controller 102 will calculate the intended locations of the item based on where items having a similar SKU characteristic are kept. For example, if controller 102 determines that the store keeps items together based on the style type and keeps men's items separated from the women's items, controller 102 will suggest that a men's polo T-shirt from BRAND X should be placed with men's polo T-shirt from BRAND Y, instead of keeping BRAND X men's polo T-shirt with BRAND X men's shirts.

Figure 11:
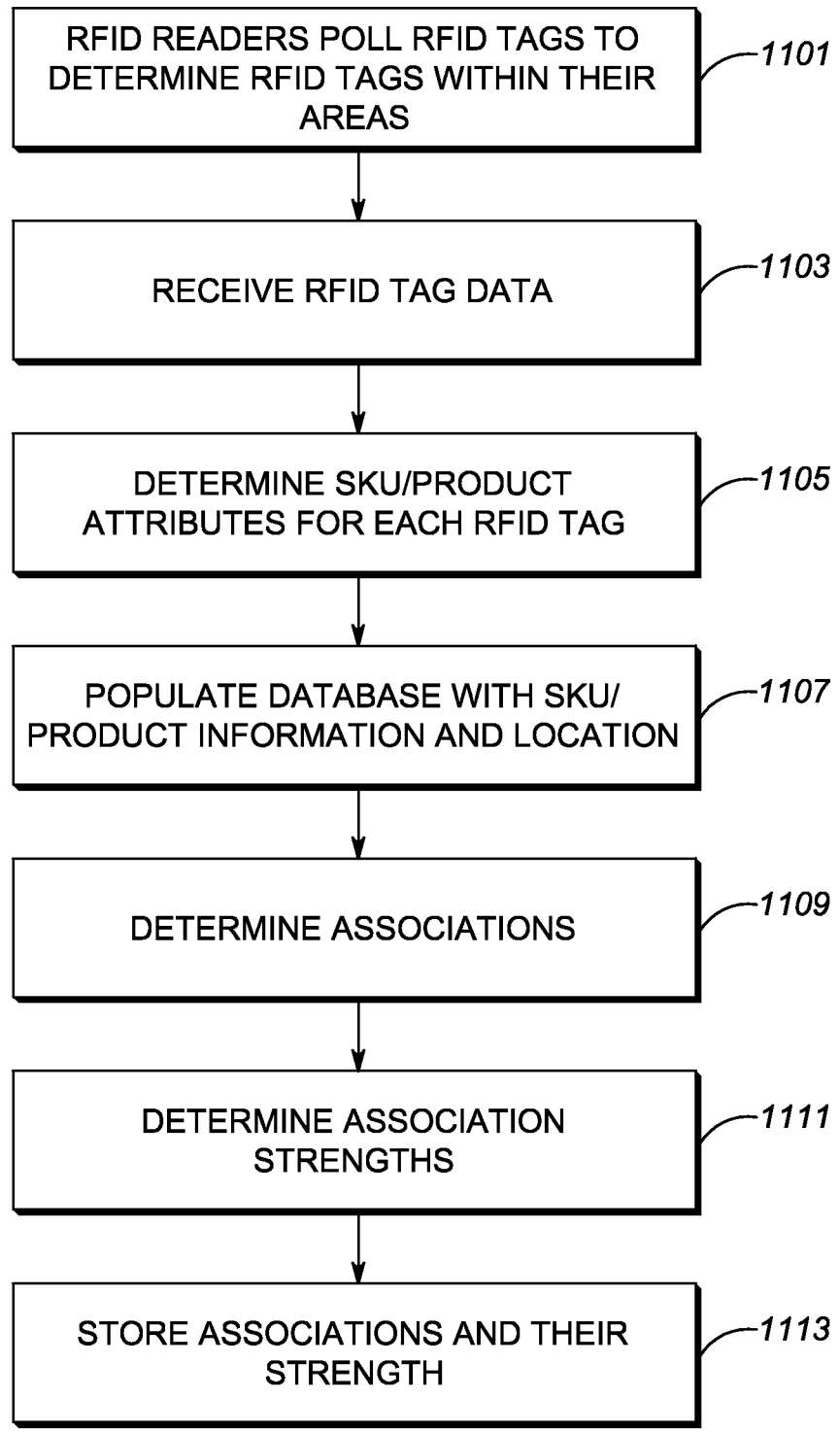
FIG. 11 is a flow chart showing operation of the controller of FIG. 1.

FIG. 11 is a flow chart showing operation of controller 102 when populating database 105. The logic flow begins at step 1101 where controller 102 communicates with multiple RFID readers causing them to poll a plurality of RFID tags. In response, at step 1103 controller receives RFID tag data for multiple tags that comprises an ID for the plurality of RFID tags read. At step 1105 controller 102 determines SKU/product attributes for the plurality of RFID tags. As discussed above, the SKU/product attribute for each RFID tag ID may be kept in database 105, or may be directly provided by the RFID tag during the read operation. Regardless of how SKU/product attributes for each tag is obtained, at step 1107, controller 105 stores the SKU/product attributes in historical database 105 by populating database 105 with at least the information shown in FIG. 12 (Tag ID, Reader ID, Brand, Sex, Location, time of scan). As is evident, database 105 is populated with tag ID, the reader ID that scanned the tag, a plurality of SKU/product attributes for the item scanned, and a location of the item. SKU/product attributes may comprise attributes taken from the group consisting of manufacturer, color, sex, size, design, type of product, ..., etc. It should be noted that database 105 may have been previously populated with similar data from past inventory scans.

At step 1109 controller 102 determines associations using scanned SKU/product attributes and historical information. For example, it may be determined that:

A certain manufacturer's items are located at a particular location (e.g., near an exit);

A particular brand is always located near items of the same brand, for example, polo shirts are always located near each other;

A certain manufacturer's items are always located near each other;

Products of a similar type are located near each other.

Products of a certain color are always located near each other.

Products for a particular sex are always located near each other.

Products with similar design are always placed near each other.

An association strength may be determined (step 1111). For example, there may exist 3 levels of strength, strong, medium, and weak. Strong associations may have existed for months, where medium associations may have existed for weeks, and weak associations for days. The associations and their strengths may be stored in database 105 (step 1113).

Figures 13, 14:
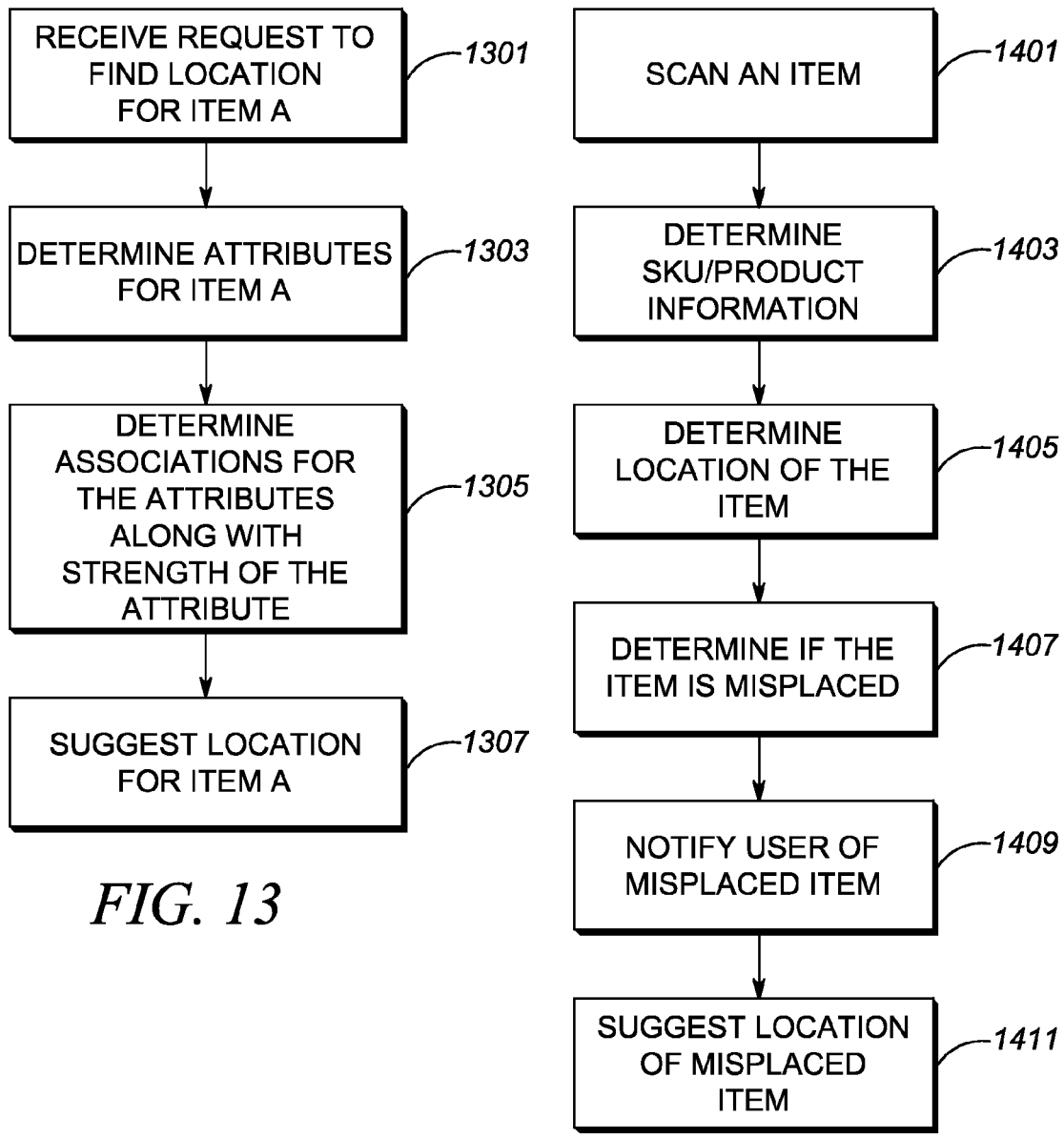
FIG. 13-FIG. 14 is a flow chart showing operation.

FIG. 13 is a flow chart showing operation of controller 102 when suggesting a location for an item. At step 1301 controller 102 receives a request to find an appropriate location for item A. As described above, item A may be the only item of its type in the store. SKU/product attributes are determined for item A (step 1303). As discussed above, these attributes may be obtained by scanning item A, or may be stored in database 105. At step 1305 controller 102 accesses database 105 and determines associations for the various SKU/product attributed determined for item A along with their strengths. Finally, at step 1307 a location or locations for item A are suggested. When multiple locations are suggested, they may be rank ordered by strength. For example, controller may suggest to locate item A with items manufactured by the same manufacturer of item A, locate item A with similar brand items, locate item A by an exit, locate item A with similar design type, ..., etc.

In a similar manner, SKU/product attribute and historical polling data can be utilized during normal inventory management operations to determine if an item is incorrectly located and automatically determine if the item is in its intended location or not based on past associations. For items with new SKUs (i.e., SKUs that have not been located prior in inventory), controller 102 can suggest possible locations for them, based on association history for similar SKU/product attributes (e.g. men's Levi's® jeans, ladies sport shoes, etc). The granularity of the location of an item will be based on the recorded info for the SKUs. For example, the granularity of the location prediction can be at a rack level or something like top left corner of a rack or so on. A flow chart of this technique is described in FIG. 14.

At step 1401 controller 102 causes the scanning of an item as part of a current inventory scan. At step 1403 SKU/product information is determined for the item. At step 1405 a current location of the scanned item is determined. This may be determined by determining which RFID reader received a response from the item, or by determining, for example that the item is located near other items. For example, the item may be located near ladies shoes. At step 1407 the SKU/product information is used with the determined associations and the item's current location to determine if the item is misplaced. A misplaced item can be identified as an item that is not located where it should be based on the stored associations. For example, if an identified association has the product type "jeans" always located near each other, a pair of jeans may be identified as misplaced if it is not located near other jeans.

At step 1409 a user may be notified that the item was misplaced. More particularly, the item may be included on a list of misplaced items provided to the user along with preferred locations for the misplaced items. For example, the user may be notified that a pair of jeans is located in isle 4 and has been identified as misplaced due to the fact that it is not located by other jeans. At step 1411 a suggested location or multiple locations for the misplaced item may be provided to the user. The locations may be rank ordered by strength.

Yet another embodiment of an inventory processing system (e.g., inventory processing system 100, FIG. 1) may be configured to determine the location of a particular RFID tag reader (e.g., any one of RFID tag readers 106, FIG. 1) within a controlled area. This capability may be based on the assumption that each RFID tag reader may be positioned in proximity to a particular shelf, rack, or area in which a particular type of article is displayed. Although the method described below is discussed in conjunction with locating a single RFID tag reader, it is to be understood that embodiments of the method may be employed to locate more than one RFID tag reader, as well.

Figure 8:
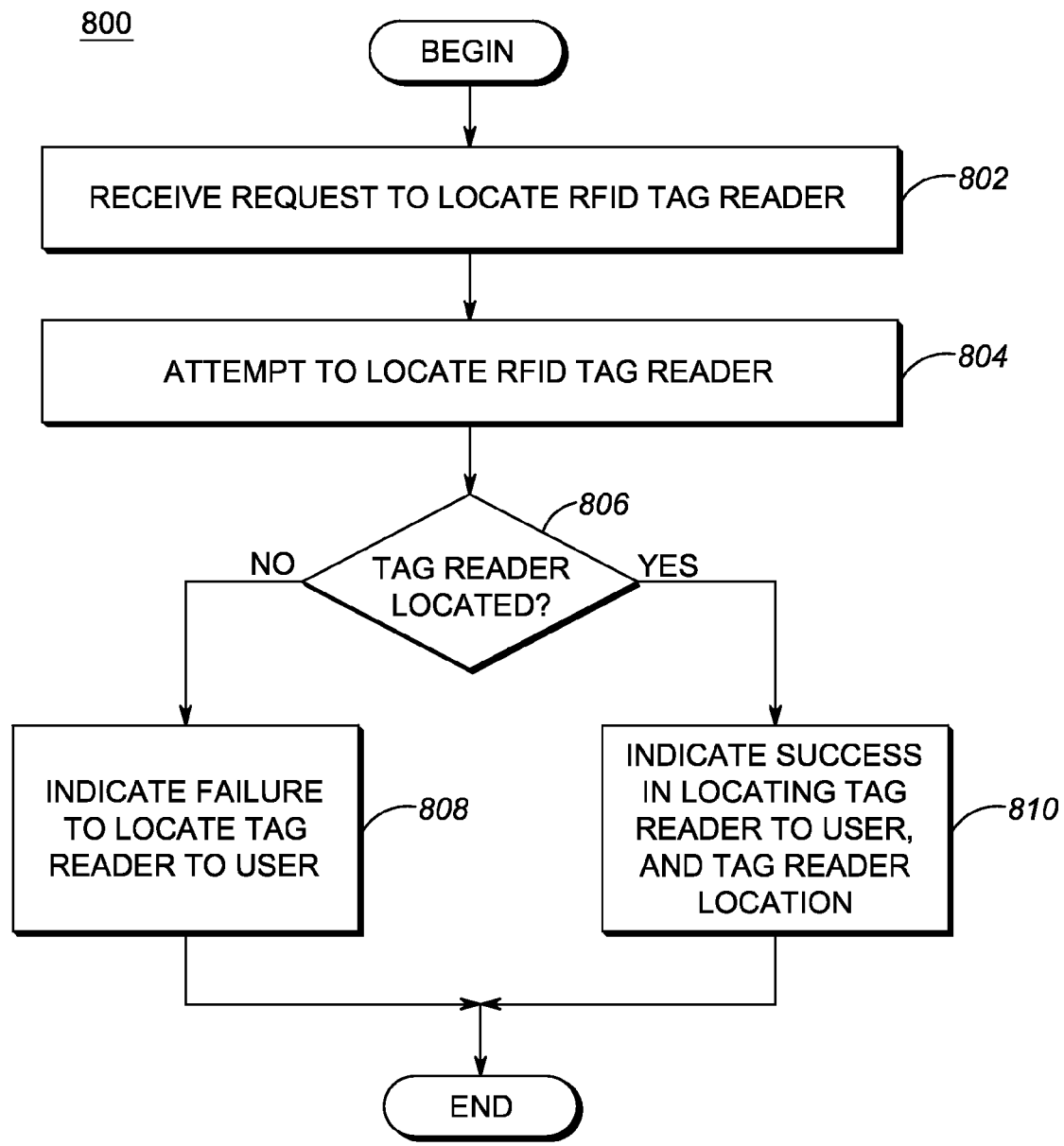
FIG. 8 illustrates a flowchart of a method for determining the location of a particular RFID tag reader, in accordance with an example embodiment.

FIG. 8 illustrates a flowchart of a method 800 for determining the location of a particular RFID tag reader, in accordance with an example embodiment. The method may begin, in block 802, by receiving an inquiry indicating a request to locate a particular RFID tag reader. For example, information defining the inquiry may be provided by a user via a user interface of the system (e.g., user interface 104, FIG. 1). For example, the user may indicate that the user desires the system to locate a particular RFID tag reader having a known identifier. In an alternate embodiment, the RFID tag reader location determination process may be initiated based on an impetus other than a user-provided inquiry. For example, in an embodiment, the system automatically may initiate the process of determining the location(s) of one or more RFID tag readers. For example, if an RFID tag reader is moved (e.g., from one rack to another), the system may self-locate the RFID tag reader after some number of polls from which the system can surmise the new location of the RFID tag reader.

In block 804, the system attempts to determine the location of the particular RFID tag reader. According to an embodiment, the system may determine the location of the RFID tag reader based on an evaluation of the RFID tags detected by the particular reader during polling operations performed by the reader. For example, if the particular reader reports RFID tags associated with a certain type of white shirt, the system can determine the location of the RFID tags as being in proximity to that certain type of white shirt. If the system further knows the actual display location of that certain type of white shirt (e.g., a particular shelf or rack), the system can more particularly determine the location of the RFID tag reader as being on or proximate to that display location. According to an embodiment, the system may gain even more accuracy (or better resolution) by also taking into account any "minority items" in proximity to the RFID tag reader (e.g., based on receiving RFID tag response signals from RFID tags associated with those "minority items"). For example, an RFID tag reader may receive RFID tag response signals indicating that 80 to 90 percent of the articles that the RFID tag reader is in proximity to are white shirts, and 10 percent of the articles that the RFID tag reader is in proximity to are ties. In that case, the system may determine with high likelihood that the RFID tag reader is near a white shirt rack, and may be closer to a side of the rack that is facing a display of ties.

In another embodiment, the system may include one or more "beacon tags," which can be used in determining the location of the RFID tag reader. A "beacon tag" is an RFID tag that is not necessarily associated with any article of inventory, but that instead is a more permanent part of the system. During deployment of the system (or thereafter), beacon tags may be placed in known locations throughout the controlled area. During each polling operation, the RFID tag readers of the system also report any beacon tags that are detected within their respective ranges. Because the locations of the beacon tags are known, the system may determine the location of the particular RFID tag reader whose location is being determined based on which beacon tag(s) are detected by the RFID tag reader. The beacon tags may provide an additional benefit, as well. When beacon tags are distributed throughout the entire controlled area, the system may ascertain whether or not the ranges of the deployed RFID tag readers are sufficient to cover the entire controlled area based on whether or not all of the beacon tags are detected during the polling operations.

A determination is made, in block 806, whether the location of the RFID tag reader was successfully identified. If not, then in block 808, the system may provide information to the user (e.g., via a displayed message on the user interface), which indicates that the RFID tag reader was not successfully located, and the method may end. If so, then in block 810, the system may provide information to the user indicating that the RFID tag reader was successfully located (e.g., via a displayed message), and indicating a location of the RFID tag reader. For example, the location of the RFID tag reader may be indicated with a description of the location (e.g., "rack 5", "near white shirts", "near beacon tag 457," "next to women's changing area"), and/or an indication of the location of the RFID tag reader on a displayed depiction of the controlled area. The method may then end.

Although the flowcharts of FIGS. 2, 3, 5, 7, and 8 depict the various method steps as occurring in a particular order, it is to be understood that some or all of the method steps may be performed in different orders and/or in parallel with other method steps. In addition, certain steps may be collapsed together or expanded into multiple steps. Such alternate embodiments are intended to be included within the scope if the inventive subject matter.

Steps of the various method embodiments, described above, may have been indicated to have been performed by an inventory monitoring controller (e.g., inventory monitoring controller 102, FIG. 1) or an RFID tag reader (e.g., RFID tag reader 106, FIG. 1). It is to be understood that some of the steps that are indicated above as being performed by an inventory monitoring controller alternatively may be performed by an RFID tag reader, and vice versa. In addition, some of the steps of the various method embodiments may be performed by system elements other than the inventory monitoring controller and the RFID tag reader. For example, but not by way of limitation, some of the steps of the various method embodiments may be performed by remotely-located computers.

Figure 9:
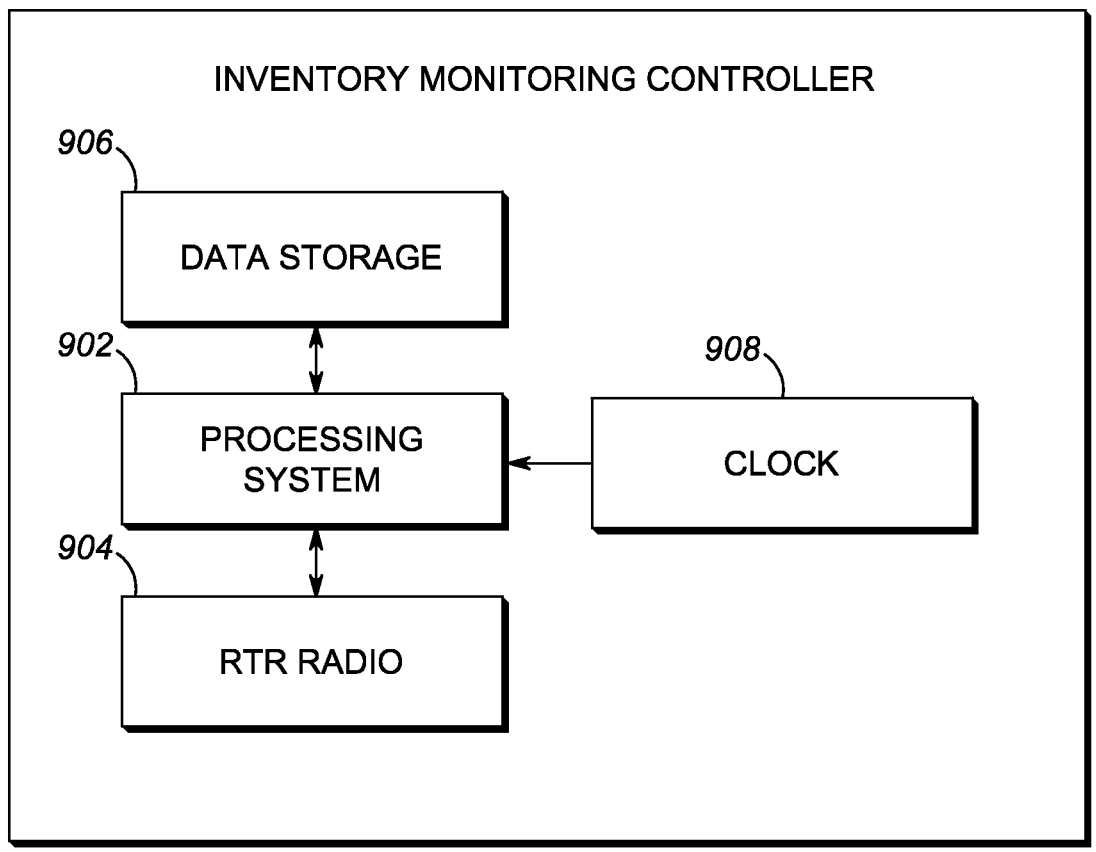
FIG. 9 is a simplified block diagram of an inventory monitoring controller, in accordance with an example embodiment.

FIG. 9 is a simplified block diagram of an inventory monitoring controller 900, in accordance with an example embodiment. Inventory monitoring controller 900 includes a processing system 902, a radio configured to communicate with RFID tag readers 904 ("RTR radio"), a data storage system 906, a clock 908, and one or more antennas (not illustrated) associated with radio 904, in an embodiment. According to an embodiment, the RTR radio 904 may implement a communication protocol that is based on an IEEE 802.11 WiFi protocol, an IEEE 802.15 Zigbee protocol, or any other public or proprietary wireless communication protocol.

Processing system 902 includes one or more general or special purpose processors and associated memory and other circuitry, which enables inventory monitoring controller 900 to perform the various method embodiments described above, through execution of machine-readable code that may be stored in data storage system 906, for example. For example, processing system 902 may create and maintain a current inventory database (e.g., in data storage system 906 or elsewhere) based on RFID tag identifying information received from RFID tag readers via RTR radio 904. In addition, processing system 902 may determine adjustments to various operational parameters (e.g., variable polling parameters and missing article detection thresholds) based on inventory changes and triggering temporal events (the occurrence of which may occur at times that are indicated by clock 908). Processing system 902 may communicate variable polling parameters and adjustments thereto in control messages, which processing system 902 may transmit to the RFID tag readers via RTR radio 904. In performing the various operations described in conjunction with various embodiments discussed herein, processing system 902 also may create, access, and/or maintain various tables (e.g., triggering temporal events table 400, FIG. 4 and/or shadow inventory table 600, FIG. 6), which may be stored in data storage system 906, for example. In addition, processing system 902 may alter its operation based on user-provided inputs via a user interface (e.g., user interface 104, FIG. 1).

Although FIG. 9 depicts an inventory monitoring controller 900 as a self-contained, electrical system, it is to be understood that an inventory monitoring controller may be implemented as a distributed system, in other embodiments, in which portions of the functionality provided by the inventory monitoring controller are provided by communicatively-coupled but discrete electrical devices.

Figure 10:
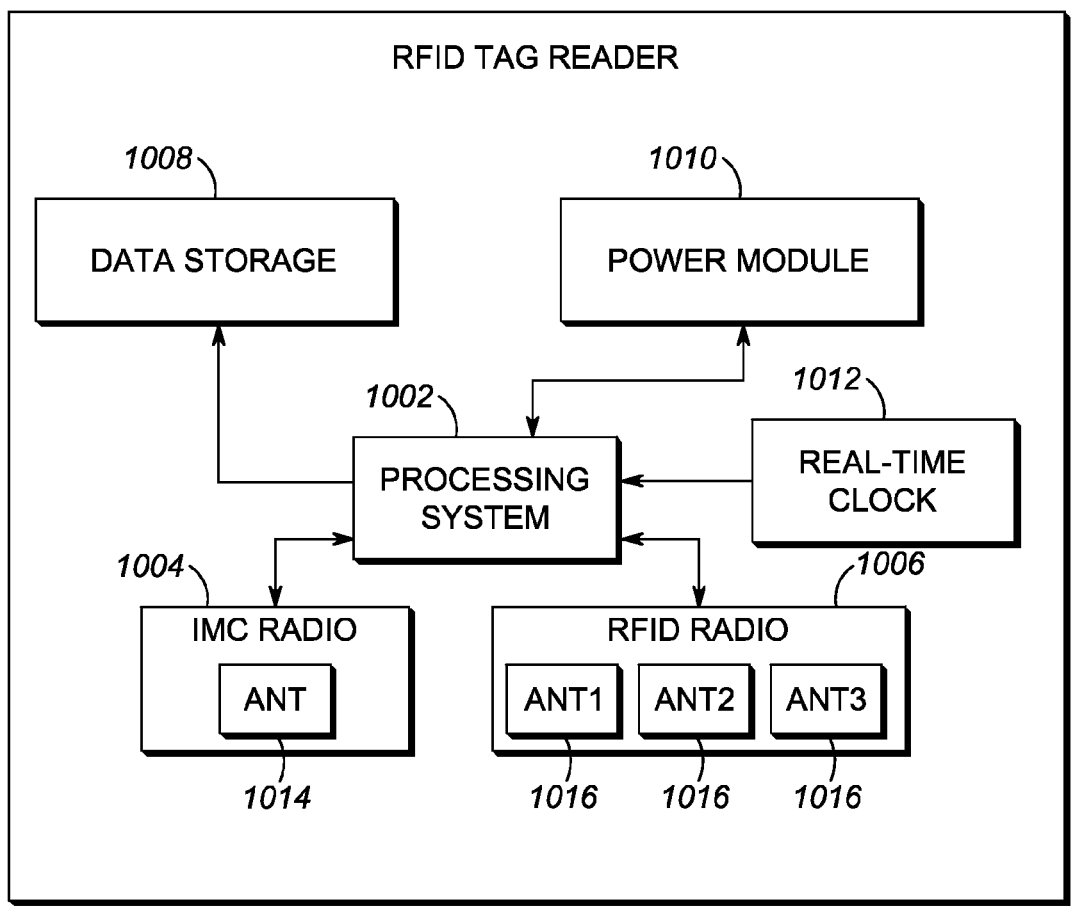
FIG. 10 is a simplified block diagram of an RFID tag reader, in accordance with an example embodiment.

FIG. 10 is a simplified block diagram of an RFID tag reader 1000, in accordance with an example embodiment. RFID tag reader 1000 includes a processing system 1002, a radio configured to communicate with an inventory monitoring controller 1004 ("IMC radio"), a radio 1006 configured to communicate with RFID tags ("RFID radio"), a data storage system 1008, a power module 1010, a real-time clock 1012, and one or more antennas ("ANT") 1014, 1016 associated with the IMC radio 1004 and the RFID radio 1006, respectively, in an embodiment.

Processing system 1002 includes one or more general or special purpose processors and associated memory and other circuitry, which enables RFID tag reader 1000 to perform the various method embodiments described above, through execution of machine-readable code that may be stored in data storage system 1008, for example. For example, processing system 1002 may receive initial or adjusted polling parameters from an inventory monitoring controller in the context of messages received through IMC radio 1004, and processing system 1002 may store the polling parameters in data storage system 1008. In addition, processing system 1002 may perform polling operations in accordance with the polling parameters at times that are indicated by real-time clock 1012. As discussed previously, the polling operations include transmitting RFID tag interrogation signals to RFID tags and receiving RFID tag response signals from the RFID tags via RFID radio 1006. Processing system 1002 also may generate messages in which processing system 1002 communicates RFID tag identifying information to the inventory monitoring controller via IMC radio 1004. In addition, processing system 1002 may send control signals to power module 1010, which cause power module 1010 to implement low-power and polling power states of operation, as described previously.

As mentioned previously, an embodiment of RFID tag reader 1000 includes multiple polling antennas 1016. For example, as illustrated in FIG. 10, RFID radio 1006 includes three polling antennas 1016 associated with it, where each of the three polling antennas 1016 may correspond to one of three possible linear polarizations aligned along the Cartesian axes, and the polarization of each of the polling antennas 1016 is substantially orthogonal to the polarizations of the other two polling antennas 1016. According to another embodiment, RFID tag reader 1000 may include more than one polling antenna associated with each polarization in order to provide additional diversity (e.g., RFID tag reader 1000 may include two or more polling antennas associated with each of the three linear polarizations). In yet another embodiment, RFID tag reader 1000 may include only a single polling antenna 1016. Although three polling antennas 1016 are illustrated in FIG. 10, it should be understood that an RFID tag reader may include more or fewer than three polling antennas 1016.

Embodiments described above include methods for an RFID-based inventory system automatically to self-optimize polling operations performed by RFID tag readers based on data the system obtains from regular polls conducted by the RFID tag readers. Furthermore, this optimization can be customized for individual RFID tag readers. In addition, embodiments of the present invention include methods for the system to provide inventory information to a user (e.g., store personnel and customers) in a more meaningful and useful manner. Included in this capability are methods for the system to locate articles (i.e., RFID tags associated with the articles) and RFID tag readers automatically, and to provide inventory information to the user in an intuitive presentation (e.g., a pictorial fashion, such as a planogram).

The foregoing detailed description is merely exemplary in nature and is not intended to limit the invention or the application and uses of the invention. Furthermore, there is no intention to be bound by any expressed or implied theory presented in the preceding technical field, background, brief summary or detailed description. For simplicity and clarity of illustration, the drawing figures illustrate the general manner of construction, and descriptions and details of well-known features and techniques may be omitted to avoid unnecessarily obscuring the invention. Additionally, elements in the drawings figures are not necessarily drawn to scale. For example, the dimensions of some of the elements or regions in some of the figures may be exaggerated relative to other elements or regions of the same or other figures to help improve understanding of embodiments of the invention.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation or use in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus. It is to be understood that the embodiments of the invention described herein may be used, for example, in other orientations than those illustrated or otherwise described herein. The term "coupled," as used herein, is defined as directly or indirectly connected in an electrical or non-electrical manner.

An embodiment includes a method for maintaining information representing an inventory of articles. The method includes the steps of maintaining information reflecting a current inventory of the articles, receiving RFID tag identifying information from an RFID tag reader, and adjusting an operational parameter based on an analysis of the RFID tag identifying information. The RFID tag identifying information identifies any RFID tags that responded to an RFID tag interrogation signal from the RFID tag reader during an inventory polling operation. The operational parameter is selected from a group consisting of a missing article detection threshold, and a variable polling parameter that defines one or more polling parameters selected from a group consisting of a time at which the RFID tag reader is to perform a next inventory polling operation, a duration of the next inventory polling operation, an identification of one or more antennas to be activated during the next inventory polling operation, and one or more antenna activation durations for the next inventory polling operation.

Another embodiment includes a method for maintaining information representing an inventory of articles that includes the step of performing a plurality of inventory polling operations using an RFID tag reader, where each of the inventory polling operations includes the RFID tag reader transmitting an RFID tag interrogation signal and transmitting RFID tag identifying information to a remote processing system that identifies any RFID tags that respond to the RFID tag interrogation signal. A time at which the RFID tag reader is to perform a next inventory polling operation of the plurality of inventory polling operations is defined by a stored version of a variable polling parameter. The method also includes the steps of receiving information indicating an adjustment to the variable polling parameter from the remote processing system in response to an occurrence of a triggering event, and updating the stored version of the variable polling parameter in response to receiving the information indicating the adjustment. The triggering event may be selected from a group consisting of an inventory change indicated by the RFID tag identifying information and an occurrence of a temporal event.

Yet another embodiment includes an inventory monitoring system that includes an RFID tag reader and an inventory monitoring controller. The RFID tag reader is configured to perform a plurality of inventory polling operations, where each of the inventory polling operations includes the RFID tag reader transmitting an RFID tag interrogation signal and transmitting RFID tag identifying information to an inventory monitoring controller. The RFID tag identifying information identifies any RFID tags that respond to the RFID tag interrogation signal. The inventory monitoring controller is configured to maintain information reflecting a current inventory, to receive the RFID tag identifying information from the RFID tag reader, and to adjust an operational parameter based on an analysis of the RFID tag identifying information. The operational parameter is selected from a group consisting of a missing article detection threshold, and a variable polling parameter that defines one or more polling parameters selected from a group consisting of a time at which the RFID tag reader is to perform a next inventory polling operation, a duration of the next inventory polling operation, an identification of one or more antennas to be activated during the next inventory polling operation, and one or more antenna activation durations for the next inventory polling operation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method comprising the steps of:
    polling a plurality of RFID tags;
    determining product attributes for items tagged with the plurality of RFID tags;
    storing the product attributes in a historical database;
    associating the product attributes with at least one other attribute;
    scanning an item;
    determining the scanned item's current location;
    determining product information for the scanned item; and
    using the determined associations, the product information, and the scanned item's current location for determining if the scanned item is misplaced based on strength of the determined associations, wherein the strength of an attribute association monotonically increases with the time period of the attribute association.

2. The method of claim 1 wherein the product attributes comprise attributes taken from the group consisting of manufacturer, color, sex of user, size, design, and type of product, and the at least one other attribute taken from the group consisting of attributes of another item, a particular area in the store, and a landmark in the store.

3. The method of claim 1 wherein the step of determining associations comprises the step of determining at least one of the following:
    a certain manufacturer's items are located at a particular location;
    a particular brand is always located near items of the same brand;
    a certain manufacturer's items are always located near each other;
    products for a particular sex are always located near each other.

4. The method of claim 1 further comprising the step of:
    notifying a user that the scanned item is misplaced.

5. The method of claim 1 further comprising the step of:
    suggesting a location or multiple locations for the misplaced item using past associations between items having similar attributes.

6. The method of claim 5 wherein the multiple locations are rank ordered by the strength of attribute association.

7. A method comprising the steps of:
    scanning an item;
    determining the scanned item's current location;
    determining product information for the scanned item;
    determining historical associations for the product information; and
    using the determined historical associations, the product information, and the scanned item's current location for determining if the scanned item is misplaced based on strength of the determined associations, wherein the strength of an attribute association monotonically increases with the time period of the attribute association.

8. The method of claim 7 further comprising the step of:
    notifying a user that the scanned item is misplaced.

9. The method of claim 8 further comprising the step of:
    suggesting a location or multiple locations for the misplaced item using past associations between items having similar attributes.

10. The method of claim 9 wherein the multiple locations are rank ordered by strength of attribute association.

11. A system comprising:
    an RFID scanner polling a plurality of RFID tags;
    a controller determining product attributes for items tagged with the plurality of RFID tags, storing the product attributes in a historical database, and associating the product attributes with at least one other attribute; and
    wherein the associations are utilized by the controller to determine if items are misplaced based on strength of the determined associations, wherein the strength of an attribute association monotonically increases with the time period of the attribute association.

12. The system of claim 11 wherein the product attributes comprise attributes taken from the group consisting of manufacturer, color, sex of user, size, design, and type of product, and the at least one other attribute taken from the group consisting of attributes of another item, a particular area in the store, and a landmark in the store.

13. The system of claim 11 wherein the controller determines associations by determining one of the following:
    a certain manufacturer's items are located at a particular location;
    a particular brand is always located near items of the same brand;
    a certain manufacturer's items are always located near each other;
    products for a particular sex are always located near each other.

* * * * *